US012216698B2

(12) United States Patent
Weitzner et al.

(10) Patent No.: US 12,216,698 B2
(45) Date of Patent: Feb. 4, 2025

(54) SYSTEM AND METHOD FOR IMPLEMENTING ONTOLOGIES IN SQL

(71) Applicant: WP SEMANTIX LTD, Ra'anana (IL)

(72) Inventors: Amit Weitzner, Ra'anana (IL); Jacob Cohen, Tel Aviv (IL)

(73) Assignee: WP SEMANTIX LTD, Ra'anana (IL)

( * ) Notice: Subject to any disclaimer, the term of this patent is extended or adjusted under 35 U.S.C. 154(b) by 0 days.

(21) Appl. No.: 18/016,383

(22) PCT Filed: Jul. 14, 2021

(86) PCT No.: PCT/IL2021/050864
§ 371 (c)(1),
(2) Date: Jan. 16, 2023

(87) PCT Pub. No.: WO2022/013873
PCT Pub. Date: Jan. 20, 2022

(65) Prior Publication Data
US 2023/0273947 A1 Aug. 31, 2023

(30) Foreign Application Priority Data
Jan. 24, 2021 (IL) .......................... 280372

(51) Int. Cl.
*G06F 16/36* (2019.01)
*G06F 16/2453* (2019.01)
(Continued)

(52) U.S. Cl.
CPC ...... *G06F 16/367* (2019.01); *G06F 16/24542* (2019.01); *G06F 16/2455* (2019.01); *G06F 40/279* (2020.01); *G06F 40/30* (2020.01)

(58) Field of Classification Search
None
See application file for complete search history.

(56) References Cited

U.S. PATENT DOCUMENTS 6,795,825 B2 9/2004 Rishe
7,519,608 B2 4/2009 Foster
(Continued)

FOREIGN PATENT DOCUMENTS

IN 110516079 A 11/2019
WO 2014210521 A1 12/2014

OTHER PUBLICATIONS

International Search Report and Written Opinion mailed Oct. 31, 2021, for International Application No. PCT/IL2021/050864, filed Jul. 14, 2021 (8 pages).

*Primary Examiner* — Christopher J Raab
(74) *Attorney, Agent, or Firm* — Brown Rudnick LLP; Matthew P. York

(57) ABSTRACT

A method for implementing a virtual ontology over a relational database, comprising: defining a virtual ontology from multiple candidates for a relational database by: declaring a hierarchy of virtual entities; for each virtual entity, declaring a mapping associating the virtual entity with at least a subset of a physical table in the database; storing the virtual entity in association with the mapping in a metadata database; and defining multiple schemas, each implemented as a different relational view of the virtual ontology and capturing at least one ontology capability, wherein querying the metadata database with a first relational query targeting one of the schemas enables writing a second relational query, wherein executing the second relational query at the relational database extracts knowledge that is opaque to the relational schema and expresses the ontology capability captured by the targeted ontology schema, thereby extracting the knowledge within a relational framework.

27 Claims, 17 Drawing Sheets

(51) Int. Cl.
  *G06F 16/2455*   (2019.01)
  *G06F 40/279*   (2020.01)
  *G06F 40/30*   (2020.01)

(56) References Cited

U.S. PATENT DOCUMENTS

| | | |
|---|---|---|
| 8,204,903 B2 | 6/2012 | Bowers et al. |
| 8,244,702 B2 | 8/2012 | Dettinger et al. |
| 8,510,321 B2 | 8/2013 | Ranganathan et al. |
| 8,719,252 B2 | 5/2014 | Miranker et al. |
| 9,396,283 B2 | 7/2016 | Miranker et al. |
| 9,535,950 B2 | 1/2017 | Bornea et al. |
| 10,176,245 B2 | 1/2019 | Lim et al. |
| 2005/0114384 A1 | 5/2005 | Beringer et al. |
| 2006/0235834 A1 | 10/2006 | Blakeley et al. |
| 2008/0256026 A1 | 10/2008 | Hays |
| 2009/0144696 A1 | 6/2009 | Andersen |
| 2009/0177640 A1 | 7/2009 | Verbaere et al. |
| 2010/0070448 A1 | 3/2010 | Omoigui |
| 2010/0241644 A1 | 9/2010 | Jackson et al. |
| 2010/0250576 A1 | 9/2010 | Bowers et al. |
| 2011/0202560 A1 | 8/2011 | Bowers et al. |
| 2013/0246382 A1* | 9/2013 | Cantrell ............... G06F 16/90 707/706 |
| 2014/0129921 A1 | 5/2014 | Bergman et al. |
| 2015/0278395 A1* | 10/2015 | Ben Jemaa ......... G06F 16/9024 707/756 |
| 2015/0363705 A1* | 12/2015 | Moore ................ H04L 12/413 706/52 |
| 2016/0162476 A1* | 6/2016 | Munro ................ G06F 40/137 704/9 |
| 2018/0018329 A1* | 1/2018 | Floratou ............ G06F 16/2452 |
| 2018/0225382 A1* | 8/2018 | Crabtree ............... G06F 15/76 |
| 2020/0285698 A1* | 9/2020 | Azevedo ............... G10L 15/18 |

* cited by examiner

300

INTRINSIC @NAME

312
| ENTITY_ID |
| ENTITY_TYPE |
| PERSON_ID |
| AGE |
| NAME |

INTRINSIC @AGE

314
| ENTITY_ID |
| ENTITY_TYPE |
| PERSON_ID |
| AGE |
| NAME |

| INTRINSIC @FIELD |
|---|
| ENTITY_ID |
| ENTITY_TYPE |
| PERSON_ID |
| NAME |
| AGE |
| FIELD |

316

| INTRINSIC @SUBJECT |
|---|
| ENTITY_ID |
| ENTITY_TYPE |
| CLASS_ID |
| SUBJECT |
| PROF_ID |

318

| INTRINSIC @REGISTRATION |
|---|
| ENTITY_ID |
| ENTITY_TYPE |
| PERSON_ID |
| NAME |
| AGE |
| REGISTRATION |

EXHAUSTIVE THING (410)
| ENTITY_ID |
| ENTITY_TYPE |
| PERSON_ID |
| NAME |
| AGE |
| FIELD |
| REGISTRATION |
| CLASS_ID |
| SUBJECT |
| PROF_ID |

EXHAUSTIVE PERSON (402)
| ENTITY_ID |
| ENTITY_TYPE |
| PERSON_ID |
| NAME |
| AGE |
| FIELD |
| REGISTRATION |

EXHAUSTIVE STUDENT (406)
| ENTITY_ID |
| ENTITY_TYPE |
| PERSON_ID |
| NAME |
| AGE |
| REGISTRATION |

EXHAUSTIVE CLASS (408)
| ENTITY_ID |
| ENTITY_TYPE |
| ID |
| SUBJECT |
| PROF_ID |

EXHAUSTIVE PROFESSOR (404)
| ENTITY_ID |
| ENTITY_TYPE |
| PERSON_ID |
| NAME |
| AGE |
| FIELD |

| EXHAUSTIVE @NAME |
|---|
| ENTITY_ID |
| ENTITY_TYPE |
| PERSON_ID |
| AGE |
| NAME |
| REGISTRATION |
| FIELD |

412

| EXHAUSTIVE @AGE |
|---|
| ENTITY_ID |
| ENTITY_TYPE |
| PERSON_ID |
| AGE |
| NAME |
| REGISTRATION |
| FIELD |

| DEREFERENCED CLASS |
|---|
| ENTITY_ID |
| ENTITY_TYPE |
| CLASS_ID |
| SUBJECT |
| PROF_ID |
| TAUGHT_BY.PERSON_ID |
| TAUGHT_BY.NAME |
| TAUGHT_BY.AGE |
| TAUGHT_BY.FIELD |
| TAUGHT_BY.ENTITY_ID |
| TAUGHT_BY.ENTITY_TYPE |
| ENROLLING.PERSON_ID |
| ENROLLING.NAME |
| ENROLLING.AGE |
| ENROLLING.REGISTRATION |
| ENROLLING.ENTITY_ID |
| ENROLLING.ENTITY_TYPE |

| DEREFERENCED PROFESSOR |
| --- |
| ENTITY_ID |
| ENTITY_TYPE |
| PERSON_ID |
| NAME |
| AGE |
| FIELD |
| ~TAUGHT_BY.CLASS_ID |
| ~TAUGHT_BY.SUBJECT |
| ~TAUGHT_BY.PROF_ID |
| ~TAUGHT_BY.ENROLLING.AGE |
| ~TAUGHT_BY.ENTITY_ID |
| ~TAUGHT_BY.ENTITY_TYPE |

506

| DEREFERENCED STUDENT |
| --- |
| ENTITY_ID |
| ENTITY_TYPE |
| PERSON_ID |
| NAME |
| AGE |
| REGISTRATION |
| ENROLLED_IN.CLASS_ID |
| ENROLLED_IN.SUBJECT |
| ENROLLED_IN.PROF_ID |
| ENROLLED_IN.ENTITY_ID |
| ENROLLED_IN.ENTITY_TYPE |
| ENROLLED_IN.TAUGHT_BY.NAME |

FIG. 5B

| DEREFERENCED PERSON |
| --- |
| ENTITY_ID |
| ENTITY_TYPE |
| PERSON_ID |
| NAME |
| AGE |
| REGISTRATION |
| FIELD |
| ~TAUGHT_BY.CLASS_ID |
| ~TAUGHT_BY.SUBJECT |
| ~TAUGHT_BY.PROF_ID |
| ~TAUGHT_BY.ENROLLING.AGE |
| ~TAUGHT_BY.ENTITY_ID |
| ~TAUGHT_BY.ENTITY_TYPE |
| ENROLLED_IN.CLASS_ID |
| ENROLLED_IN.SUBJECT |
| ENROLLED_IN.PROF_ID |
| ENROLLED_IN.ENTITY_ID |
| ENROLLED_IN.ENTITY_TYPE |
| ENROLLED_IN.TAUGHT_BY.NAME |

FIG. 5C

SYSTEM AND METHOD FOR IMPLEMENTING ONTOLOGIES IN SQL

FIELD OF THE DISCLOSED TECHNIQUE

The disclosed technique relates to ontologies, in general, and to a system and method for implementing an ontology in SQL, in particular.

BACKGROUND OF THE DISCLOSED TECHNIQUE

Database technologies provide a wide range of models for storing, organizing, managing, and retrieving information. One of the most commonly used models is the relational database, which organizes data into tables, where the columns define data attributes, and the rows store data instances. Relationships defining logical connections between tables are created by adding a common column to two tables, typically referred to as a key. Structured Query Language (SQL) is a popular language for accessing and controlling data in a relational database, and has become an industry standard due to its simplicity and ease of use.

However, the inability of relational databases to capture the inherent meaning of words limits their use as knowledge bases. The meaning inherent to a relational database is confined to the schema which defines how the data are organized. The schema is the structural blueprint of a relational database. Thus, any meaning that can be extracted from a relational database is limited to the schema defined by the database designer.

Semantics is the study of the inherent meaning captured by words and phrases in human language. Communication depends on attaching semantic meaning to language based on a common understanding of words. Without consensus over the meaning of words, differences in opinions and perspectives could not be understood or resolved. In an attempt to achieve a more natural interface with humans, modern computers use semantic meaning to interpret human language.

A semantic triple is the fundamental data structure in the Resource Description Framework (RDF) model codifying data as a subject-predicate-object expression. A triple-store database, also known as a knowledge base, allows for semantic queries using semantic query languages, such as SPARQL, that provide an interface for analytical query operations. Although more powerful than relational interfaces for extracting knowledge, structure semantic queries are complicated and require special skills, beyond the conventional SQL commands.

An ontology is a formalization for describing things through taxonomies, classifications and inter-relatedness. The ontology defines concepts, categories and rules for organizing raw data items into information for extracting knowledge. An ontology provides a common terminology for describing concepts and categories to facilitate communication between different platforms. Ontologies share similarities with object oriented hierarchical class structures, with the noted difference that ontologies offer greater flexibility for representing data originating from heterogeneous sources. The Web Ontology Language (OWL) is a common language for representing knowledge as an ontology, and allows for applying logical rules, such as cardinality, reasoning and inference from data codified using an RDF model.

However, many databases are organized relationally, making it difficult to extract contextual and semantic knowledge from the data they already store. Moreover, querying with advanced query languages, such as SPARQL and GREMLIN, requires skills and familiarity with these languages that are beyond those of conventional database users. Thus, much of the knowledge stored inside existing databases cannot be easily accessed in a convenient manner for the typical user.

U.S. Pat. No. 9,396,283, to Miranker, entitled "System for Accessing a Relational Database using Semantic Queries" relates to integrating relational database schema into a semantic web framework. The SQL query optimizer present in the standard SQL database engine is used with a mapping process to represent the relational representation of data as RDF triples. The RDF triples are created during compilation to eliminate the problem of consistency between the relational database and the triple store. A semantic query is then translated to SQL queries that operate on the triples.

US patent application publication US 2011/0202560 A1, to Bowers, entitled "Expressing and Executing Semantic Queries within a Relational Database" relates to defining semantic rules applied to executing semantic queries using relational table valued functions and common table expressions. The table valued functions are then called to execute the semantic query against a relational database.

US patent application publication 2010/0242644 A1 to Jackson, entitled "Graph Queries of Information in Relational Database" relates to converting a query written in a graph-based query language into a relational language for executing over a relational database. Multiple views of the underlying tables of the relational database are calculated to correspond to the specifications of the graph. The translated query is executed on the views to implement the graph-based query.

U.S. Pat. No. 6,795,825B2 to Riche, entitled "Database Querying System and Method" relates to interpreting a database query to allow querying of non-relational and relational databases using languages originally intended only for relational databases. The system represents every class of the relational schema with a corresponding virtual table.

SUMMARY

It is an object of the disclosed technique to provide a novel method and system for implementing an ontology in a relational environment.

In accordance with the disclosed technique, there is thus provided a method for implementing a virtual ontology over a relational database comprising: a method for implementing a virtual ontology over a relational database, comprising: defining a virtual ontology from multiple candidate ontologies for a relational database by: declaring a hierarchy of multiple virtual entities; for each one of the multiple virtual entities in the hierarchy, declaring a corresponding mapping associating the one virtual entity with at least a subset of at least one physical table defined by a relational schema of the relational database, thereby introducing data stored in the relational database to the virtual ontology; and storing the virtual entity in association with the corresponding mapping in a virtual ontology metadata database implemented as a relational database; and defining multiple ontology schemas, each implemented as a different relational view of the virtual ontology and capturing at least one ontology capability, wherein querying the ontology metadata database with at least a parsed portion of an intercepted first relational query targeting one of the multiple ontology schemas enables rewriting the first relational query as a second relational query, wherein executing the second relational query at the relational database enables extracting ontological knowledge from the data that is opaque with respect to the relational schema and which expresses the at least one ontology capability captured by the targeted one of the multiple ontology schemas, thereby enabling extracting the ontological knowledge within a relational framework.

There is provided, in accordance with another embodiment of the disclosed technique, a system for implementing a virtual ontology over a relational database, comprising: a relational database management system (RDBMS), comprising: a relational database comprising data organized in multiple physical tables with a corresponding relational schema defining a structure for the relational database, and an RDBMS execution engine; and an Object Document Mapping (ODM) computer comprising: an ODM storage unit configured to store a virtual ontology, the virtual ontology comprising: a hierarchy of multiple virtual entities, multiple corresponding mappings associating each of the multiple virtual entities with at least a subset of at least one of the multiple physical tables, thereby introducing data stored in the relational database to the virtual ontology, an ontology metadata database storing the hierarchy of multiple virtual entities with the multiple corresponding mappings, and multiple ontology schemas, each of the multiple ontology schemas providing a different relational view of the virtual ontology and capturing at least one ontology capability, and an ODM processor configured to: intercept a first relational query targeting one of the multiple ontology schemas, and query the ontology metadata database with at least a parsed portion of the first relational query to rewrite the first relational query as a second relational query, wherein executing the second relational query at the relational database enables extracting ontological knowledge from the data that is opaque with respect to the relational schema and which expresses the ontology capability captured by the targeted one of the multiple ontology schemas, thereby enabling extracting the ontological knowledge within a relational framework.

There is provided, in accordance with another embodiment of the disclosed technique, a method for extracting ontological knowledge from a relational database with a relational query, comprising: receiving a virtual ontology, comprising: a hierarchy of multiple virtual entities, multiple corresponding mappings associating each of the multiple virtual entities with at least a subset of at least one of multiple physical tables of the relational database, thereby introducing data stored in the relational database to the virtual ontology, an ontology metadata database storing the hierarchy of multiple virtual entities with the multiple corresponding mappings, and multiple ontology schemas, each providing a different relational view of the virtual ontology and capturing at least one ontology capability; submitting a first relational query targeting one of the multiple ontology schemas; querying the ontology metadata database with at least a parsed portion of the first relational query to rewrite the first relational query as a second relational query with respect to a relational schema for the relational database; and executing the second relational query at the relational database to extract ontological knowledge from the data that is opaque with respect to the relational schema, the ontological knowledge expressing the at least one ontology capability captured by the targeted one of the multiple ontology schemas, thereby extracting the ontological knowledge within a relational framework.

In some embodiments, the multiple virtual entities comprise concepts and properties, wherein each of the defined concepts includes at least one of the properties.

In some embodiments, the at least one ontology capability captured by a first one of the multiple ontology schemas comprises the defined hierarchy.

In some embodiments, the at least one ontology capability captured by a second one of the multiple ontology schemas is an inheritance capability between two of the multiple virtual entities.

In some embodiments, the at least one ontology capability captured by a third one of the multiple ontology schemas is a graph traversal capability between two of the multiple virtual entities.

In some embodiments, the graph traversal capability further captures transitivity from the two of the multiple virtual entities to a third one of the multiple virtual entities.

In some embodiments, the at least one ontology capability further includes a reverse flow of the graph traversal capability.

In some embodiments, the at least one ontology capability further comprises a logic calculation with respect to at least one of the multiple virtual entities.

In some embodiments, each of the multiple ontology schemas has a corresponding logic, wherein rewriting the first relational query as the second relational query comprises applying the logic corresponding to the targeted one of the multiple ontology schemas.

BRIEF DESCRIPTION OF THE DRAWINGS

The disclosed technique will be understood and appreciated more fully from the following detailed description taken in conjunction with the drawings in which:

FIGS. 3A-3C, taken together, illustrate an intrinsic schema of the virtual ontology of FIG. 2B, constructed and operative in accordance with another embodiment of the disclosed technique;

FIGS. 4A-4C, taken together, illustrate an exhaustive schema for the virtual ontology of FIG. 2B, constructed and operative in accordance with a further embodiment of the disclosed technique;

FIGS. 5A-5D, taken together, illustrate a dereferenced schema providing a graph traversal capability over the virtual ontology of FIG. 2B, constructed and operative in accordance with another embodiment of the disclosed technique;

DETAILED DESCRIPTION OF THE EMBODIMENTS

The disclosed technique overcomes the disadvantages of the prior art by providing a system and method for bridging the gap between relational information systems (RDBMS) and ontological information systems. Many organizations store their data in relational databases, and interface with the data via relational query languages, such as SQL. The advent of the Semantic Web has revealed the potential of ontological taxonomies that allow for the contextual inference of knowledge from data, knowledge which is unavailable from conventional relational schema. However, converting existing relational databases to an ontology can be costly. Moreover, retraining employees familiar with SQL syntax to use semantic languages, such as SPARQL, poses an additional hurdle.

The disclosed technique addresses the demand for knowledge inference while recognizing the need to provide Semantic Web functionalities via familiar relational syntax and existing relational data storage technologies to reduce costs. To achieve this, a virtual ontology is defined and overlaid on the relational scheme of the relational database. The virtual ontology captures semantic characteristics of hierarchical taxonomy representations of data to enable the inference of contextual knowledge that would otherwise be opaque, and hence unavailable, if the data were presented exclusively under the relational schema of the RDBMS. However, the virtual ontology is implemented with relational constructs to maintain compatibility within the existing relational infrastructure. Additionally, the interfacing of the user with the virtual ontology interfaces is achieved using familiar relational query syntax, such as SQL.

Thus, although the virtual ontology provides aspects of Semantic Web for extracting knowledge, the implementation remains within the confines of familiar, native relational technologies and syntax. In the description that follows, due to its ubiquitous use, the language SQL is used when referring to a relational query language for accessing the RDBMS. However, the intent is not to limit the disclosed technique to any particular version of SQL, but rather to refer to SQL as a general category of relational query languages. It is to be noted that the disclosed technique is compatible with any backend query language used to access the existing relational database system, and that customized Business Intelligence (BI) tools and applications may be substituted where appropriate.

Figure 1A:
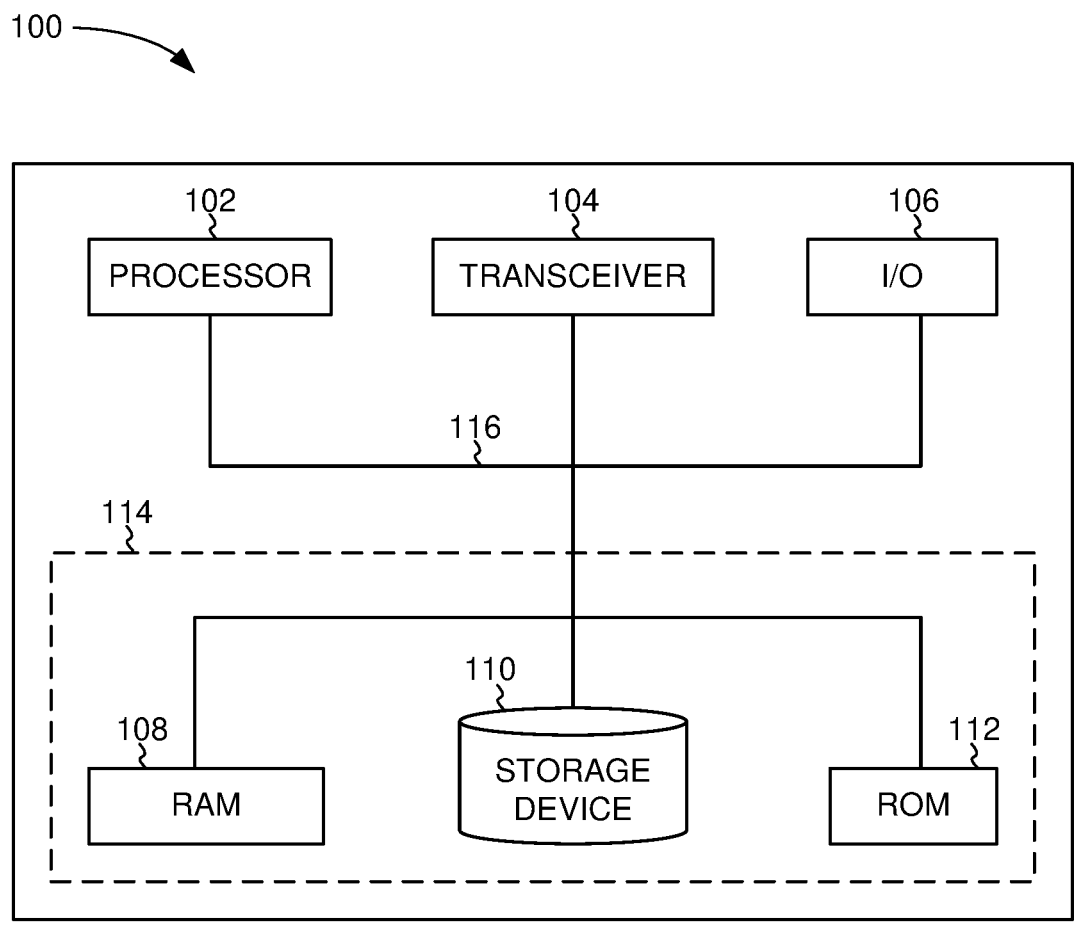
FIG. 1A is a schematic illustration of a computing device constructed and operative in accordance with an embodiment of the disclosed technique.

Reference is now made to FIG. 1A, which is a schematic illustration of a computing device, generally referenced 100, constructed and operative in accordance with an embodiment of the disclosed technique. Device 100 is representative of a computing device for implementing aspects of the disclosed technique, such as but not limited to, a desktop computer, a mobile phone, a tablet, a server, and the like. Device 100 includes at least one processor 102, at least one transceiver 104, at least one input/output device (I/O) 106, a random-access memory (RAM) 108, a non-volatile computer readable storage device 110 and a read only memory (ROM) 112, the latter three collectively referred to herein as memory 114. Processor 102, transceiver 104, I/O 106, and memory 114 comprising RAM 108, storage device 110, and ROM 112, are electrically coupled via a common bus structure 116.

At least one processor 102 includes one or more central processing units (CPUs), graphical processing units (CPUs), accelerated processing units (APUs) and the like. Transceiver 104 is operative to enable two-way communication between device 100 and additional devices or routers (not shown), such as to send and receive data and computer executable instructions, via wired means, such as electrical or optical cables and wires, and/or wireless means, such as long, medium, or short wave radio communication, including satellite communications, cellular communications, Wifi, BlueTooth™, Zigbee, radar, lidar, infrared, microwave technologies, and the like. Transceiver 104 is operative to connect device 100 to a network, such as a local area network (LAN), a wide area network (WAN), or an external network such as the Internet. The network may be implemented in any suitable manner, such as with a client-server architecture or a peer-to-peer architecture. I/O 106 is operative to interface with the environment, such as with a human user of device 100, and includes one or more input and output interfaces, such as, but not limited to, a visual display, an electronic mouse, a keyboard, a touch-based screen, a loud speaker, a microphone, and the like. It will be appreciated that device 100 may operate without human operation and without I/O device 106.

To carry out operations of the disclosed technique, processor 102 is operative to execute one or more instructions relating to data retained in memory 114. RAM 108 may include a static random access memory (SRAM). Storage device 110 may be implemented using known means, such as electronic, magnetic, optical, electromagnetic, or semiconductor technologies, or any suitable combination thereof, and may include one or more of a portable disk, a hard disk, a digital versatile disk (DVD), a memory stick, to name but a few. ROM 112 may include one or more of a compact disc read-only memory (CD ROM), an erasable programmable read-only memory (EPROM or Flash memory). Information stored in memory 114 is not to be construed as being transitory signals, such as radio waves, electromagnetic waves, optical pulses, or electrical signals transmitted through a wire.

Although FIG. 1A shows device 100 as a stand-alone device, this is for illustrative purposes only. In some implementations, the components of device 100 as illustrated in FIG. 1A are logical or virtual representations of multiple physical components distributed over multiple devices at one or more physical locations, and that operate in a coordinated manner to carry out operations of the present invention, as is known in the art of distributed computing.

Figure 1B:
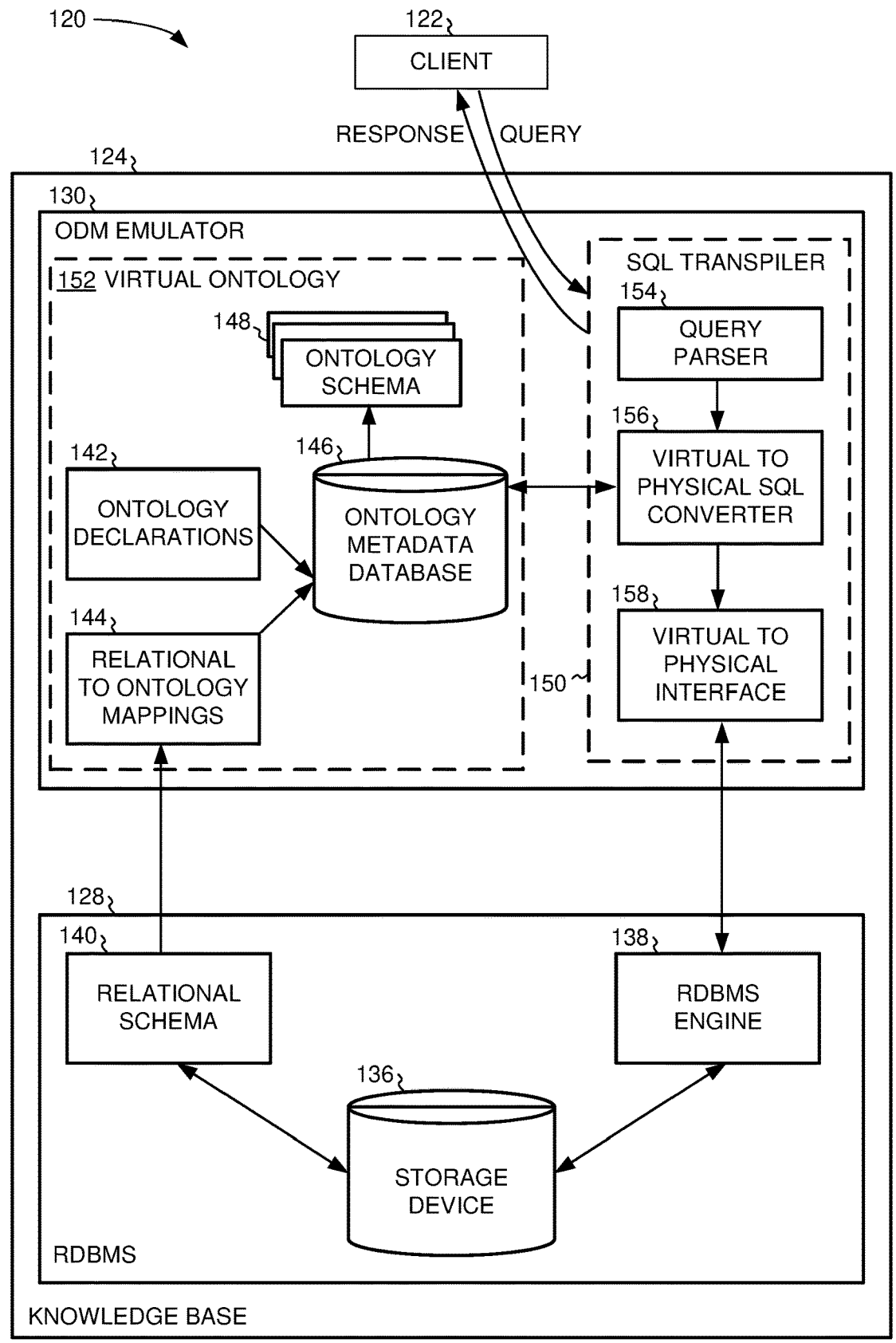
FIG. 1B illustrates a system for emulating an ontology data model (ODM) within a RDBMS framework, constructed and operative in accordance with another embodiment of the disclosed technique.

Reference is now made to FIG. 1B, which illustrates a system, generally referenced 120, for providing ontological capabilities inside an RDBMS framework, constructed and operative in accordance with an embodiment of the disclosed technique. System 120 includes a client 122 communicating with a knowledge base 124. Client 122 may implemented with a computing device, such as device 100, configured with a software application for interfacing with a relational database. Knowledge base 124 includes a RDBMS 128 and an ODM emulator 130. Both RDBMS 128 and ODM emulator 130 are implemented using relational constructs that are accessible using familiar relational languages, such as SQL.

RDBMS 128 is a conventional relational database system, and includes a data storage device 136 for physically storing data according to a relational schema 140, and a RDBMS engine 138 for handling relational queries directed to data stored in storage device 136. It is to be understood that the term "physical" as used herein with reference to data storage is a relative term. Databases are typically modelled on three layers: a user layer, a logical layer, and a physical layer of tables, alternatively referred to as "external" tables. The tables of a relational schema are typically related according to one or more keys, such as primary (PK) and foreign keys (FK). RDBMS engine 138 provides access to data stored in storage device 136 according to conventional techniques. On receiving a SQL query, RDBMS engine 138 processes and executes the query by performing one or more read, write, edit and delete operations, and provides the results of the query.

ODM emulator 130 provides a virtual ontology layer interfacing between client 122 and RDBMS 128. ODM emulator 130 may be implemented with a computing device, such as device 100, configured with a software application for executing program code instructions to implement the functionalities defined herein below for ODM emulator 130. ODM emulator 130 operates as an adapter that allows client 122 to extract ontological knowledge from RDBMS 128 using SQL formulated queries. ODM emulator 130 includes ontology declarations 142, relational-to-ontology mappings 144, an ontology metadata database 146, multiple ontology schemas 148, and a SQL transpiler 150. Ontology declarations 142, relational-to-ontology mappings 144, ontology metadata database 146, and ontology schemas 148 together form a virtual ontology 152. Ontology metadata database 146 is implemented as a relational database. SQL transpiler 150 converts queries targeting virtual ontology 152 for execution by RDBMS 128.

An ontology author declares ontology declarations 142 and relational-to-ontology mappings 144 using an extended SQL definition language, described in greater detail below. Ontology declarations 142 define the virtual entities (e.g. concepts and properties) of the virtual ontology and their respective capabilities. For example, the capabilities may relate to concept and property hierarchies, graph traversal, inheritance, and rule inferencing, to name but a few. The ontological capabilities provided by the virtual ontology augment the capabilities provided by the relational structure of RDBMS 128.

The ontology author additionally declares relational-to-ontological mappings 144 that link (i.e. "introduce") the physical data individuals stored in RDBMS 128 to the virtual entities defined for virtual ontology 152. Relational-to-ontological mappings 144 create a correspondence between the physical data stored at storage device 136, in the tables and rows as defined by relational schema 140, to the virtual entities declared in ontology declarations 142. Thus, relational-to-ontological mappings 144 link the virtual entities of virtual ontology 152 to the physical data stored in RDBS 128. ODM emulator 130 cross-references the definitions of ontology declarations 142 and relational-to-ontology mappings 144 with the definitions of relational schema 140, and stores the results in ontology metadata database 146.

ODM emulator 130 creates multiple ontology schemas 148 as different relational views of virtual ontology 152. Each schema 148 captures one or more ontological capabilities that are outside the conventional relational capabilities provided by relational schema 140 of RDBMS 128. For example, one of schemas 148 may capture the hierarchy of the entities (i.e. concepts and/or properties) of virtual ontology 152. Another one of schemas 148 may additionally capture an inheritance capability derived from the hierarchy. Yet another one of schemas 148 may capture a graph traversal capability derived from the hierarchy. Since ontology schemas 148 are implemented as different relational views, the respective ontology capabilities of virtual ontology 152 are accessible via queries formulated in relational languages, such as SQL.

ODM emulator 130 presents the ontology schema 148 to client 122 as different relational views for virtual ontology 152. Client 122 submits a SQL formulated query (i.e. "the first SQL query") targeting one of ontology schemas 148. Transpiler 150 intercepts the first SQL query and converts it to one or more SQL statements to produce a "second SQL query" that is executable by RDBMS 128, as detailed below.

SQL transpiler 150 includes a query parser 154, a virtual-to-physical converter 156, and a virtual-to-physical interface 158. On intercepting the first SQL query (i.e. received from client 122), parser 154 parses the first SQL query to identify which of the multiple ontology schemas 148 is targeted by the first SQL query. Additionally, parser 154 parses the first SQL query to identify the referenced virtual entities (i.e. concepts and/or properties). The identity of the ontology schema is used to determine the logic for rewriting the second SQL query. The identities of the virtual entities are used to determine which physical relational tables, (i.e. defined in relational schema 140), the second SQL query will subsequently reference.

Virtual-to-physical converter 156 queries ontology metadata database 146 to determine which of the physical relational tables and rows of relational schema 140 correspond to the parsed virtual entities of virtual ontology 152 referred to in the first SQL query. Virtual-to-physical converter 156 applies the logic corresponding to the targeted ontology schemas 148 to write the second SQL query as one or more SQL statements that reference the physical tables of RDBMS 128 determined above, such that executing the second SQL query via RDBMS 128 produces a response revealing knowledge that expresses the ontological capabilities captured by the targeted one of schemas 148. Virtual-to-physical interface 158 submits the second SQL query to RDBMS 128. RDBMS engine 138 executes the second SQL query using conventional techniques, and provides the response to SQL transpiler 150 of ODM emulator 130 via virtual-to-physical interface 158, which provides the response to client 122.

For example, a SQL query targeting the schema capturing just the hierarchy of virtual ontology 152 would be rewritten for execution by RDBMS 128 according to a first logic. A SQL query targeting the schema that additionally captures the inheritance capability of virtual ontology 152 would be rewritten for execution by RDBMS 128 according to a second logic. A SQL query targeting the schema that additionally captures the graph traversal capability of virtual ontology 152 would be rewritten for execution by RDBMS 128 according to a third logic. In addition to applying the logic for the targeted schema, SQL transpiler 150 rewrites the SQL query received from client 122, which references entities of virtual ontology 152, to reference the physical tables and rows defined by relational schema 140. The rewritten SQL query can thus be executed by RDBMS engine 138 using conventional relational techniques. Importantly, the logic applied by SQL transpiler 150 formulates the second SQL query such that when RDBMS engine 138 executes the second SQL query at RDBMS 128, the response extracts from RDBMS 128 knowledge revealing the ontological capability of the targeted schema, e.g. hierarchy, inheritance, graph traversal, and the like. This knowledge is ontological knowledge that would not be easily accessible by querying RDBMS 128 directly with respect to relational schema 140. ODM emulator 130 thus provides ontological capabilities for extracting ontological knowledge that augment the conventional relational capabilities of RDBMS 128, while remaining within a relational (i.e. SQL) framework.

Consequently, client 122 interfaces with knowledge base 124 as though it were a conventional relational database. Each of ontology schemas 148 has the appearance of a relational schema and may be queried using SQL syntax. SQL transpiler 150 uses ontology metadata database 146 to map the virtual entities of virtual ontology 152, referred to in the first SQL query, to one or more corresponding relational entities of RDBMS 128. Each one of ontology schemas 148 has a corresponding logic for implementing the ontological capabilities. SQL transpiler 150 applies the corresponding logic for the targeted one of schemas 148 when rewriting the second SQL query. In this manner, executing the second SQL query on RDBMS 128 extracts knowledge capturing the ontological capabilities of the targeted one of schemas 148.

Virtual ontology 152 is superimposed over the relational schema and represents the data stored in RDBMS 128 as a graph of ontology entities exhibiting a semantic hierarchy. While capturing ontological capabilities, virtual ontology 152 is implemented using relational constructs. The ontology author defines virtual ontology 152 in advance using an Ontology definition language (ODL), which is similar to conventional data definition languages (DDLs) with extensions for declaring entities having ontological characteristics. The entities of virtual ontology 152 do not necessarily correspond to the physical tables of the relational schema for RDBMS 128. In particular, ontology entities can also represent properties, which in RDBMS 128, appear only as columns of tables. The ontology author may define one or more inference rules that the ontology entities are subject to, such as concept and property inheritance, property symmetry, transitivity, and inversion. The ontology author then maps the data items, i.e. the individuals, stored in RDBSM 128, to the entities defined for virtual ontology 152 via mappings 144 such that queries targeting virtual ontology 152 produce answers relating to data stored in RDBMS 128.

The ontology author additionally uses ODL statements to define relationships between the entities defined for the ontology to connect these entities to form a graph. The relationships may be one-to-one, one-to-many or many-to-many relationships. The graph can be subsequently traversed to extract knowledge, providing yet another ontological capability. Importantly, all these ontological capabilities are implemented within the existing relational framework, and are accessible with queries formulated in SQL syntax. The ontology definition and mappings are stored in database 146.

As noted, virtual ontology 152 is presented to client 122 as multiple relational views via ontology schemas 148, each capturing a different set of ontological capabilities. While the ontology schema appear as convention relational schema to client 122, each has a corresponding logic for implementing the respective ontological capabilities, described in greater detail below. The "intrinsic" ontology schema expresses the hierarchy explicitly defined by the ontology author for virtual ontology 152. The "exhaustive" ontology schema additionally enables querying higher-level entities for opportunistic properties and reflections of underlying sub-entities in the hierarchy. The exhaustive ontology schema adds to the intrinsic ontology schema, any columns that may be derived from concepts in the underlying hierarchy. The "dereferenced" ontology schema further adds the capability of inferring knowledge by traversing over the ontology as a graph. Each of ontology schemas 148 are presented to client 122 as virtual relational schemas that are queryable with SQL formulated queries, and presents a different set of virtual relational tables and rows corresponding to virtual concepts and properties of virtual ontology 152.

Essentially, one can view virtual ontology 152 as a higher dimensional ontological representation of the physical data stored according to the lower-dimensional relational schema 140. The higher dimensional ontological representation provides greater connectivity, associations, and hierarchy between the data facts stored in RDBMS 128, as defined by the ontology author. Each of the ontology schema subsequently generated by SQL transpiler 152 presents a different, lower dimensional (i.e. relational) projection of the higher dimensional ontological representation. This enables client 122 to query virtual ontology 152 using a lower dimensional interface, e.g., using SQL, just as multiple 2D projections of a 3D object allow analyzing the 3D object with 2D vectors. In this manner, knowledge base 124 remains in the lower dimensional relational world, both in terms of the physical storage of the data, as well as the user interfacing via SQL, while providing knowledge extraction capabilities characteristic of higher dimensional ontologies.

Client 122 queries knowledge base 124 by submitting a SQL query with respect to one of schemas 148. Thus, the SQL query received from client 122 may reference a virtual entity of virtual ontology 152 that does not have a corresponding physical table or column in RDBMS 128. Consequently, RDBMS engine 138 may not be able to directly execute a SQL query received from client 122.

SQL transpiler 150 intercepts the SQL query received from client 122 and rewrites the query for relational schema of RDBMS 128 such that it may be executed by RDBMS engine 138. Query parser 154 parses the query from client 122 to identify the referenced virtual entities of virtual ontology 152 and the targeted schema 148. Virtual-to-physical converter 156 queries ontology metadata database 146 with the identified virtual entities to determine the corresponding physical tables and rows of relational schema 140. Virtual-to-physical converter 156 applies the logic corresponding to the targeted schema 148, i.e. by performing a reasoning procedure that applies mappings 144 and inferencing rules and relationships defined by the ontology author and corresponding to the targeted schema 148, to convert the query from client 122 for RDBMS 128, such that the converted query captures the respective ontological capabilities. Consequently, executing the rewritten (i.e. converted) query by RDBMS engine 138 extracts ontological knowledge. Since both the original query and the converted query are formulated in SQL, the conversion performed by SQL transpiler 150 is a SQL to SQL conversion from virtual ontology 152 to the relational schema 140 of RDBMS 128.

SQL transpiler 150 submits the converted query to RDBMS engine 138 via virtual-to-physical interface 158. RDBMS engine 138 executes the converted query and provides the results to SQL transpiler 150, which presents the results to client 122. In this manner, client 122 is able to extract knowledge from RDBMS 128 with a SQL formulated query, where this knowledge reflects ontological capabilities that are exclusive to virtual ontology 152. This allows users who are less familiar with advanced query languages, such as SPARQL, to extract knowledge from RDBMS 128 inherent to virtual ontology 152 without having to leave the familiar relational environment. Moreover, the ODM emulator 130 saves the cost of converting RDBMS 128 to a triple store database.

In this manner, virtual ontology 152 provides client 122 with a higher-dimensional ontology model for the data that is physically stored according to the lower-dimensional relational schema. The higher-dimensional ontology enables client 122 to access knowledge from the data that would otherwise be inaccessible. The relational implementation of virtual ontology 152 maintains compatibility with the SQL environment of the existing RDBMS 128, and ensures usability by users who are less familiar with advanced semantic languages. A description for defining virtual ontology 152 now follows.

Ontology Definition

Ontologies represent knowledge as concepts organized as a network of nodes. As such, ontologies have hierarchical, inheritance, and inference capabilities that bear a similarity to object oriented classes. An ontology is built from entities that are linked via relationships to form a hierarchical directed graph. The structure of the ontology can subsequently be mined to infer knowledge, for example, from an inheritance hierarchy defined for two entities, or a graph connectivity reflecting a relationship between two entities.

The ontology author creates virtual ontology 152 using an Ontology Definition Language (ODL), which offers a rich toolset of ontological capabilities that are not typically provided by relational platforms. The ODL allows defining an architecture of ontology entities from which knowledge can be inferred through inheritance, symmetry, transitivity, inversion, and graph traversal, to name but a few. The ODL includes extensions to the data definition language (DDL) used to define the relational schema. The extended instruction set of the ODL is used to define ontological features, such as concepts, properties, and their characteristics. There may be any number of possible virtual ontology schemas for a given relational schema, and the ODL allows defining a malleable virtual ontology that may be adapted and modified with time, to suit evolving needs, e.g. of client 122. Since the implementation is virtual, any modifications to virtual ontology 152 incur little cost.

The ODL allows the ontology author to design virtual ontology 152 within a virtual relational framework, i.e. without having to rewrite the data and store the data as triple stores. Thus, the existing RDBMS system remains unchanged, saving significant costs. Virtual ontology 152 may organize the data completely differently from relational schema 140 of RDBMS 128, and thus may include concepts, properties and relationships that do not exist in relational schema 140. The design of virtual ontology 152 is left to the discretion of the ontology author. Since the implementation is virtual, the ontology author has flexibility to adapt virtual ontology 152 over time to suit the needs of client 122 at relatively low cost. The same data stored according to relational schema 140 can be mapped to multiple ontologies each capturing different semantic world views. Virtual ontology 152 may also be defined to include only a subset of the data stored in RDBMS 128, for example to ensure security and privacy, or efficiency when only a subset of the data is needed for an application.

More than a mere graph database, virtual ontology 152 allows for applying inferencing rules, such as class inheritance, property inheritance, symmetry, transitivity, inversion, property logic, property aliasing, and the like. The ODL allows the ontology author to define inferencing rules for virtual ontology 152 corresponding to those provided by web ontology languages, such as OWL 2.0.

Declaring Ontology Entities: Concepts and Properties

To declare the entities of virtual ontology 152, the ODL provides CREATE CONCEPT and CREATE PROPERTY instructions. The syntax is similar to the DDL syntax for creating tables and columns. Unlike in relational schema 140 where properties are defined strictly as columns of tables, in ontologies, properties are ontological entities as well. Thus both concepts and properties are represented by virtual tables in the ontology schema subsequently presented to client 122. For example, the ODL statement CREATE CONCEPT Person (Person_ID int, Name string, Age int) creates three virtual tables: a virtual table representing the concept Person and virtual tables representing the properties Name and Age. In the ontology schema, virtual tables representing properties are indicated, such as with the character "@" to distinguish properties from concepts. Thus @Name and @Age refer to virtual tables representing properties, whereas Person refers to a virtual table representing a concept. The virtual table for Person has three columns: Person_ID as a primary key (PK), Name storing a string value, and Age storing an integer. When viewing virtual ontology 152 via the ontology schema 148, all three virtual tables are presented to client 122 for querying with SQL.

The ODL statement: CREATE CONCEPT Company (Company_ID int, Name string, Age int) creates a virtual table for Company with three virtual columns: Company_ID as a PK, Name and Age. However, @Name and @Age already exist in the ontology as properties, defined above for Person. Therefore, the virtual tables @Name and @Age now additionally store the names and ages for individuals belonging to Person or Company. Consequently, Person and Company are now related by their shared properties, even though no formal relationship was declared between them. The tables @Name and @Age may subsequently be queried to mine for knowledge related to both Persons and Companies through their shared properties. If the ontology author were to declare Name as a string for one concept, and as a number for another concept, an error will be triggered, since Name exists as an entity over the entire ontology.

Once virtual ontology 152 has been created, to enable client 122 to query knowledge base 124 using SQL statements, SQL transpiler 150 presents virtual ontology 152 as multiple ontology schema 148. Each of ontology schema 148 is implemented with virtual relational tables, and thus may be queried with SQL. However, while the implementation is relational, each of ontology schema 148 captures a different subset of the ontological capabilities of virtual ontology 152, each presenting a lower dimensional (i.e. relational) projection of the higher dimensional virtual ontology 152 to client 122. At a minimum, each ontology schema at least includes the relational schema 140 for RDBMS 128. Thus, if no virtual ontology has been defined for knowledge base 124, client 122 may query knowledge base with respect to relational schema 140 for RDBMS 128. In this case, SQL transpiler 150 passes the query directly to RDBMS engine 138.

From the perspective of client 122, each ontology schema 148 appears as a relational schema that is queryable with SQL. However, each ontology schema may include additional virtual tables and columns that are not included in relational schema 140, and capture one or more ontological capabilities, such as inference through inheritance, symmetry, transitivity, inversion, capabilities, and the like.

The most fundamental of ontology schema 148 is the intrinsic schema. The intrinsic schema includes any tables and columns defined in the original relational schema for RDBMS 128, and additionally, virtual tables and columns corresponding to the ontology entities explicitly defined by the ontology author. To present virtual ontology 152 according to the intrinsic schema, SQL transpiler 150 presents to client 122 the relational schema and any virtual tables declared by the ODL statements defining virtual ontology 152. The virtual columns for the virtual tables of the intrinsic schema correspond to properties declared explicitly in the ODL statements as well as inherited properties.

The exhaustive schema of ontology schema 148 includes the virtual tables and columns of the intrinsic schema. Additionally, virtual columns are added to the virtual tables for properties that are inferable from descendant concepts in the ontology hierarchy. Thus, the exhaustive schema additionally captures knowledge inferred from the concept hierarchy.

The dereferenced schema of ontology schema 148 additionally includes virtual tables and columns that express graph traversability over the virtual ontology. Graph traversability is implemented relationally through the use of FKs that connect the virtual tables representing two related entities. The virtual tables of the dereferenced schema include any information that could be accessed by hopping from one entity to the related entity via the FK, as though traversing a graph. By querying the virtual tables of the dereferenced schema, client 122 effectively extracts knowledge inferred via graph traversal, however the implementation is done entirely with SQL formulated queries and relational tables. The dereferenced schema is described in greater detail below with respect to the graph traversal capability. The description describes a graph traversal capability of one degree, however it is to be understood that the technique may similarly be applied to achieve a graph traversal of multiple degrees.

Concept Inheritance Definition

The ODL includes an Inherit instruction that provides an inheritance capability. A derived concept is effectively a subset of a parent (i.e. base) concept, and the relationship enables important ontology capabilities, such as abstraction (when moving from derived to base) and distinction (when moving from base to derived). Inheritance is implemented with respect to the attributes as well as any relationships associated with the parent (i.e. base) concept. For example, a relational schema includes a Parent table linked to a Mother table with a foreign key (FK). However, there is nothing in this relationship to enable inferring semantic meaning between Mother and Parent. Conversely, in an ontology schema, defining Mother as inheriting from Parent captures the hierarchical relationship of Mother as a subset of Parent. Thus, CREATE CONCEPT Mother Inherits Parent creates a virtual table Mother that automatically inherits the properties from Parent. These include any attribute properties (e.g. Age, Marital status) as well as relationships to other concepts, e.g. a virtual column "Parent To" storing a FK linking a Parent to a Child. This leads to semantically meaningful statements such as Alice (a parent) is a Parent To Sam (a child).

In a similar manner, Father may be created as inheriting from Parent, i.e. CREATE CONCEPT Father Inherits Parent. A one-to-one relationship "Spouse" may be defined between the concepts Mother and Father with the instruction, CREATE PROPERTY Spouse (Mother, Father). This statement creates a virtual column "Spouse" in the virtual tables for Mother and Father. In the virtual table for Mother, Spouse stores the primary key (PK) of the corresponding Father as a FK. In the virtual table for Father, Spouse stores the PK of the corresponding Mother as an FK. Since all Grandmothers are also Mothers, the ODL statement CREATE CONCEPT Grandmother Inherits Mother creates a virtual table Grandmother that inherits the properties of Mother, with virtual columns for Age and Marital Status, the relationship "Parent To" tracing back to Parent, and additionally a virtual column "Spouse" which is inherited directly from Mother. Relationships are presented in the dereferenced schema, but not in the exhaustive or intrinsic schema.

The following method is an exemplary implementation for rewriting an SQL query to capture inheritance:

Obtain the mappings between the physical tables of RDBMS 128 and the concepts in the concept hierarchy for virtual ontology 152. Note, although in the exemplary ontology of FIGS. 2A-2B, each physical table is mapped to an ontology concept, however this is not required.

Apply a union across the mappings to add to the query result individuals mapped to the child concepts.

Automatically assign columns when adding a property of a child concept to a parent concept.

Include the added property in the query received from the client as a common table expression (CTE), or a sub-query.

For example, given the following concept hierarchy for a virtual ontology: Concepts—Concept A inherits Thing, Concept B inherits A, Concept C inherits B, and the following mapping to the relational schema: Tables—Table T1 mapped to A, Table T2 mapped to B, Table T3 mapped to C. On receiving a query from client 122:

SELECT*from Intrinsic.$A$ WHERE . . . (rule)

SQL transpiler 150 performs a reasoning procedure on the query by applying the ODL ontology definition statements and mappings, and rewrites the query as the following CTE query:

```
With Intrinsic_A AS (
    SELECT * from T1
    UNION ALL
    SELECT * from T2
    UNION ALL
    SELECT * from T3)
    SELECT * FROM Intrinsic_A WHERE ... (rule)
Sub-Query:
    SELECT * FROM t
    (SELECT * from T1
    UNION ALL
    SELECT * from T2
    UNION ALL
    SELECT * from T3)
    ) as Intrinsic __ A
WHERE ... (rule)
```

This adds individuals stored in T2 and T3 to the query results for concept A, reflecting the inheritance hierarchy between the concepts B and C corresponding to T2 and T3, and concept A. If client 122 submits the following query:

SELECT*from Intrinsic.$B$ WHERE . . . (rule)

SQL transpiler 150 rewrites the query similar to the query above with the noted exception that individuals from table T1 are not included. This is because B is lower down in the hierarchical scheme and already inherits from A, and thus already includes the individuals of T1 mapped to A. The rewritten query is as follows:

```
With Intrinsic_B AS (
    SELECT * from T2
    UNION ALL
    SELECT * from T3)
  SELECT * FROM Intrinsic_B WHERE ... (rule)
Sub-Query:
  SELECT * FROM t
    (SELECT * from T2
    UNION ALL
    SELECT * from T3)
  ) as Intrinsic_B
WHERE ... (rule)
```

Implementing Concept Inheritance:

The following ODL statements define a Company concept, and additionally an Employee and Adult inheriting from Person, where Employee includes a relationship "works_in" to Company:

```
CREATE CONCEPT Company(cid string, name string)
CREATE MAPPING companies( ) INTO Company AS    SELECT
"ABC" AS cid, "ABC Inc." AS name
  CREATE CONCEPT Person(pid string PRIMARY KEY, name string,
  age int);
  CREATE CONCEPT Employee(works_in string REFERENCES
  Company(cid)) INHERITS Person;
  CREATE CONCEPT Adult( ) FROM Person WHERE age>18;
  CREATE MAPPING people( ) INTO Person AS
  SELECT "1" AS pid, "john" AS name, 16 AS age;
  CREATE MAPPING employees( ) INTO Employee AS
  SELECT "2" AS pid, "eric" AS name, 29 AS age, "ABC"
  AS works_in;
```

The individuals of Employee are added explicitly via the CREATE MAPPING statement, whereas the individuals of Adult are determined explicitly with a WHERE statement. Each concept is presented as a virtual table in each of the intrinsic, exhaustive, and dereferenced schema, either as common table expressions, or as subqueries.

For the intrinsic schema, inference through inheritance is implemented with the UNION operator on all the mappings relating to the designated concept. Thus, the following SQL query targeting the intrinsic schema:

SELECT*FROM intrinsic.Person is rewritten by SQL transpiler 150 as:

```
WITH Person AS (
  SELECT "1" AS pid, "john" AS name, 16 AS age
  UNION ALL
  SELECT "2" AS pid, "eric" AS name, 29 AS age
)
  SELECT * FROM Person
```

Executing these SQL instructions on the physical database allows client 122 to extract knowledge inferable through inheritance.

For the exhaustive schema, the properties for all of the descendants are added recursively to the virtual tables for each concept. Starting from the topmost node in the hierarchy, "Thing", any properties of concepts derived from Thing are added to Thing. For each derived concept from Thing, properties derived from those concepts are added, until there are no more derived concepts. Thus, properties are added to higher hierarchical concepts from lower derived concepts.

The following query targeting the exhaustive schema:

SELECT*FROM exahustive.Person is rewritten by SQL transpiler 150 as:

```
WITH Person AS (
  SELECT "1" AS pid, "john" AS name, 16 AS agem, NULL as works_in
  UNION ALL
  SELECT "2" AS pid, "eric" AS name, 29 AS age, "ABC" AS works_in
)
SELECT * FROM Person
```

The "works_in" property is NULL padded to the "people" mapping, since all Person descendant properties should be exposed in the exhaustive schema. Executing the above SQL instruction on the physical database allows client 122 to additionally extract knowledge from the concept hierarchy, e.g. to learn about properties declared only for lower ordered entities, from higher-ordered entities.

For the dereferenced schema, columns additionally present possible graph traversals from a concept. Since SQL transpiler 150 generates the rewritten SQL query in real time, the relevant implementation is transpiled only when a relationship property is explicitly requested. To add columns accessible via graph traversal, SQL transpiler 150 uses a LEFT JOIN SQL instruction. Thus, the following SQL query targeting the dereferenced schema:

SELECT name, 'works_in.company_name' FROM dereferenced. Person is rewritten by SQL transpiler 150 as:

```
WITH Person AS (
 SELECT name, c.company_name AS 'works_in.company_name'
 FROM (
   SELECT "1" AS pid, "john" AS name, 16 AS agem, NULL as works_in
   UNION ALL
   SELECT "2" AS pid, "eric" AS name, 29 AS age, "ABC" AS works_in
 ) p LEFT JOIN (
   SELECT "ABC" AS cid, "ABC Inc." AS NAME
 ) c ON p.works_in = c.cid
)
SELECT name, 'works_in.company_name' FROM Person
```

Executing these SQL instruction on the physical database allows client 122 to additionally extract knowledge by traversing the relationships of the ontology as branches on a graph.

Property Inheritance Definition

In the virtual ontology of the disclosed technique, just as concepts capture inheritance, so do properties. Property inheritance enables abstraction/distinction capability over relationships, as opposed to concepts. Any defined property characteristics (e.g. inversion, transitivity, etc.) are automatically acquired by the derived properties via inheritance. As a formal inference rule, property inheritance is defined as:

$$DerivedProperty(x,y) \rightarrow BaseProperty(x,y)$$

The disclosed technique implements this ontology capability by declaring properties via the ODL. For example, the ODL statement CREATE PROPERTY @Name as String creates a property Name storing values of type string. Additional properties may be declared to inherit from @Name, e.g. CREATE PROPERTY @Person_Name Inherits Name and CREATE PROPERTY @Company_Name Inherits Name create child properties Person_Name and Company_Name that are semantically related to the property @Name through inheritance. Subsequently, knowledge learned about @Person_Name and @Company_Name is inferable for @Name via the exhaustive schema. Similarly, declaring the concepts Person and Company with: CREATE CONCEPT Person (Person_ID, Person_Name, Age) and CREATE CONCEPT Company (Company_ID, Company_Name, Age) relates these concepts through a shared ancestor, e.g. the parent property @Name.

The following ODL statements declare a property entity Name, and two concepts, Person and Company, each including a property inheriting from Name, e.g. First_Name and Company_Name, respectively:

```
CREATE PROPERTY Name(name);
CREATE CONCEPT Person(Person_ID, Age, First_Name Inherits Name)
CREATE CONCEPT Company(Company_ID, Company_Name Inherits Name)
```

Executing the statement: SELECT entity_id, name from @name, returns all the names of both people and companies.

The following demonstrates different options for introducing properties and the property inheritance:

```
CREATE PROPERTY name string;
CREATE PROPERTY first_name string INHERITS name;
CREATE CONCEPT Person(pid string, first_name string, last_name INHERITS name, age int);
CREATE MAPPING people( ) INTO Person AS
  SELECT "1" as pid, "john" AS first_name, "Doe" AS last_name,
  30 AS age;
```

The property "name" is introduced explicitly, as well as "first_name" which inherits from "name" and therefore has the same SQL data type. The property "last_name" inheriting from "name" is introduced within the CREATE CONCEPT statement. The following statement is now executable: SELECT pid, name, age FROM Person.

Property inheritance is implemented by the transpiler by incorporating column aliasing within SELECT statement. Since the 3D world of ontologies is being mapped to the 2D world of the relational model, a collision might exist in the intrinsic/exhaustive schemas, which would need to be resolved before executing on RDBMS 128. In the example above, "Person" effectively has two "name" properties (both "first_name" and "last_name" as "name"). The ontology author may determine to resolve this with the following options:

none: No resolution is made, and base properties are not exposed within the intrinsic/exhaustive schemas.

first: Base property are exposed by order of declaration. In the above case, since "first_name" is declared first, that will be the designated value of "name" for the intrinsic/exhaustive schemas.

concatenate: The value of base properties will be concatenation of all derived properties.

For example: for the query SELECT pid, name FROM intrinsic.Person,

If the option is "none", after transpiling, this will produce:

```
ERROR "name" column does not exist for
  intrinsic.Person.
```

If the option is "first", after transpiling the query is rewritten as:

```
WITH Person AS ( SELECT "1" as pid, "john" AS first_name, "Doe" AS
last_name, 30 AS age, first_name AS name)
SELECT pid, name FROM Person
```

If the option is "concatenate", after transpiling the query is rewritten as:

```
WITH Person AS ( SELECT "1" as pid, "john" AS first_name, "Doe" AS
last_name, 30 AS age, first_name + "," + last_name AS name)
SELECT pid, name FROM Person
```

For the dereferenced schema this problem does not exist, since dereferenced schema allows mapping 3D world of ontology into separated rows in the 2D world via UNION, for instance:

```
SELECT pid, name FROM exhaustive.Person WITH Person AS (
SELECT
"1" as pid, "john" AS first_name, "Doe" AS last_name, 30 AS age,
first_name AS name
 UNION ALL
SELECT "1" as pid, "john" AS first_name, "Doe" AS last_name, 30 AS
age, last_name AS name)
SELECT pid, name FROM Person
```

Complex Concept Definition

The ODL provides the ontology author with a range of inheritance capabilities for capturing various aspects of inheritance. For example, the ODL allows for multiple inheritances in the concept hierarchy, restrictions, and the like. Multiple inheritance allows a single sub-concept to inherit properties from multiple different super-concepts. Restrictions allow a sub-concept to disinherit a property from a super-concept, whereas the CREATE PROPERTY instruction enables defining a property for a sub-concept that is not inherited from the super-concept, either as a direct property explicitly defined for the sub-concept, or as a reference property relating the sub-concept to another concept. Thus, the CREATE PROPERTY and Restriction instructions of the ODL allow sub-concepts to participate in different relationships and have different attributes than the super-concept. Complex concept definitions are implemented with set operators, such as union, union all, intersect, and minus. As an example, the concept Mother may inherit from both Women and Parent concepts.

Transitive Property Definition

Transitivity is another ontology capability provided by the disclosed technique. Defining a property as transitive allows inferring knowledge from two sets of related concepts. For example, for the transitive property @Ancestor, the statement X is an Ancestor to Z is inferable from the statements X is an @Ancestor to Y, and Y is an @Ancestor to Z. The ODL provides the ontology author with instructions to define property transitivity. The disclosed technique implements transitivity within the relational SQL platform through the use of FKs added to the virtual tables representing the entities. Consequently, knowledge inference through transitivity is provided to client 122 via the dereferenced schema.

As a formal inference rule, transitivity is expressed as:

$$Property(x,y), Property(y,z)\ Property(x,z)$$

In ontologies, the property transitivity enables inferring "multi-hop" relationships between concepts and is commonly used to define "HAS A" type relationships, as contrasted with "IS A", which expresses inheritance. The following is an exemplary implementation for property transitivity according to the disclosed technique:

```
CREATE PROPERTY located_in string REFERENCES Transitive
Thing(entity_id);
CREATE CONCEPT Continent(continent_id string PRIMARY KEY, name
string, population bigint, area_sq_km long);
CREATE CONCEPT Country(country_id string PRIMARY KEY, name
string, population bigint, capital string, located_in REFERENCE
Continent(continent_id));
CREATE CONCEPT City(city_id string PRIMARY KEY, name string,
located_in REFERENCES Country(country_id)
CREATE MAPPING continents( ) INTO Continent AS
 SELECT "1" AS continent_id, "Europe" AS name, 750000000 AS
population, 1000000 AS area_sq_km;
CREATE MAPPING countries( ) INTO Country AS
 SELECT "2" AS country_id, "Germany" AS name, 83000000 AS
population, "Berlin" as capital, "1" AS located_in;
CREATE MAPPING cities( ) INTO City AS
 SELECT "3" AS city_id, "Berlin" AS name, "2" AS located_in;
```

This ontology declares 3 concepts (Continent, Country, City) and 5 properties (located_in, name, population, area_sq_km, capital). "located_in" is explicitly declared as transitive with FK to any Thing. When a transitive relationship property is referenced in a query, if the target concept includes the same property, that property FK is further traversed to its target concept recursively. The following query:

```
SELECT 'located_in.name', 'located_in.capital', 'located_in.population',
'located_in.area_sq_km' FROM dereference.City WHERE name = "Berlin"
``` will provide the following results:

TABLE 1

| located_in.name | located_in.capital | located_in.population | located_in.area_sq_km |
|---|---|---|---|
| Germany | Berlin | 83000000 | |
| Europe | | 750000000 | 1000000 |

The "located_in" property effectively exposed all properties of all concepts traversable by the transitive property. Semantically, "Berlin" is indeed located both in "Germany" and "Europe".

Transitive properties are implemented using UNION operator and are implemented via the dereferenced schema as graph traversals. SQL transpiler 150 converts the above statement to:

```
WITH City AS ( SELECT country.name AS 'located_in.name',
country.capital AS 'located_in.capital', country.population AS
'located_in.population', NULL AS 'located_in.area_sq_km'
FROM
(SELECT "3" AS city_id, "berlin" AS name, "2" AS located_in) city
 LEFT JOIN
(SELECT "2" AS country_id, "germany" AS name, 83000000 AS
population, "berlin" as capital, "1" AS located_in) country
 ON city. located_in = country.country_id
UNION ALL
 SELECT continent.name AS 'located_in.name', NULL AS
'located_in.capital', continent.population AS 'located_in.population',
continent.area_sq_km AS 'located_in.area_sq_km'
FROM
(SELECT "3" AS city_id, "berlin" AS name, "2" AS located_in) city
 LEFT JOIN
(SELECT "2" AS country_id, "germany" AS name, 83000000 AS
population, "berlin" as capital, "1" AS located_in) country
 ON city.located_in = country.country_id
 LEFT JOIN
(SELECT "1" AS continent_id, "europe" AS name, 750000000 AS
population, 1000000 AS area_sq_km) continent
 ON country located_in = continent.continent_id)
```

Transpiler 142 "flattens" the transitive properties of all target concepts, exposing their properties while padding "missing" properties with NULL where appropriate.

Symmetric Property Definition

Symmetry is another ontology capability provided by the disclosed technique. The ODL provides an instruction to define property symmetry, which allows inferring knowledge from two related concepts. For example, if the ontology author defines the property @Spouse as symmetric, SQL transpiler 150 uses the definition to infer the statement "X is a Spouse to Y" from the statement "Y is a Spouse to X". Knowledge inferable through property symmetry is presented to client 122 via the dereferenced schema.

Inversion Property Definition

Relationship properties are directed. Property inversion allows inferring an explicitly named property in the opposite direction to its definition. As a formal inference rule, property inversion is defined as:

$$Property(x,y) \rightarrow InverseProperty(y,x)$$

For example, for the invertible properties @Parent_of and @Child_To, the statement X is a Child_To to Y is inferable from the statement Y is a Parent_To to X. Knowledge inferred through property inversion is presented to client 122 via the dereferenced schema. An exemplary implementation of property inversion now follows:

```
CREATE CONCEPT Company(cid string PRIMARY KEY, name string)
CREATE CONCEPT Employee(eid string PRIMARY KEY, name string,
employer string REFERENCES INVERSE employee Company(cid))
```

This declares Employer as a relationship property, with FK to the Company concept. The INVERSE clause defines the reverse property "Employee" for Company. The following statement returns all employees of the company ABC:

```
SELECT '~employee.name' FROM dereference
    .Company WHERE name="ABC"
```

Property inversion is built-in to the disclosed technique by the indicating relationship direction in the dereferenced schema, e.g. with the character "~". This creates an inversed property for any target concept of any relationship property. Thus, property inversion is effectively aliasing. Property inversion is thus implemented via the dereference schema as a graph traversal. The above example is translated into:

```
SELECT '~employer.name' FROM dereference
    .Company WHERE name="ABC"
```

Property Logic Definition

As a formal inference rule, property logic may be defined as:

$$Concept(x), Property_1(x,a_1), Property_2(x,a_2), \ldots \rightarrow CalculatedProperty(x, f(a_1, a_2, \ldots))$$

Property logic allows to automatically attach a new property to a concept as a "calculated" property based on a function of the existing property values. An exemplary implementation of property logic follows:

```
CREATE CONCEPT Person(pid string PRIMARY KEY, first_name
string, last_name string);
CREATE PROPERTY full_name string AS
 SELECT first name + " " + last_name AS full_name FROM Person;
CREATE MAPPING people INTO Person AS
 SELECT "1", "john", "doe"
```

Consequently, every individual of type Person (and descendants) now includes another property which may be accessed via the respective exhaustive (or dereferenced) schema: "full_name". The following SQL query returns "1", "john doe":

SELECT pid, full_name FROM exhaustive.Person

Property logic may be implemented in SQL as follows:
the FROM clause declares the base concept on which the property is relevant. Thus, only concepts of this type, or its descendants have this property in their respective exhaustive schema.
No JOIN, WHERE, GROUP BY, HAVING or LIMIT SQL expressions are allowed. The property must act on all rows of the designated concept.

To implement this efficiently, SQL transpiler 150 "chains" the property logic into the common table expression (CTE), whenever the property logic is requested in the client's SELECT statement. For the above, the following generated CTE will be executed:

```
WITH Person AS (
 WITH Person AS (
 SELECT "1", "john", "doe"
)
 SELECT *, first_name + " " + last_name FROM Person;
)
SELECT pid, full_name FROMPerson
```

The property logic SELECT clause is prepended with an asterisk (*) to mask the original concept CTE, thereby including the property logic. In case a derived concept is referenced, the FROM clause would be replaced as well.

Mapping

The ODL statement CREATE MAPPING serves several purposes. The first purpose is to map individuals (i.e. data items) to virtual ontology 152. The individuals may already be stored in RDBMS 128 and linked to virtual ontology 152 with the CREATE MAPPING statement, or alternatively may be explicitly introduced to virtual ontology 152 with the CREATE MAPPING statement. In addition, the CREATE MAPPING statement maps relationships between entities, as relevant to the graph traversal capability described herein.

Introducing Data Individuals to the Ontology

The ODL provides the ontology author with a CREATE MAPPING statement to introduce facts and/or new relationships to the ontology. In one implementation, the CREATE MAPPING statements is used to link the data individuals, stored physically in RDBMS 128, to virtual ontology 152.

As noted, the physical data continues to be stored in RDBMS according to the relational schema 140, with ODM emulator 130 serving as an adapter interfacing between client 122 and RDBMS 128. The CREATE MAPPING instruction links the data stored in the physical tables of RDBMS 128 to the abstract hierarchical tree structure of virtual ontology 152.

The advantages to this technique are several-fold. First, the physical data stored in RDBMS 128 does not have to be moved to accommodate its reorganization via virtual ontology 152. Rather, the physical data continue to be stored according to the original relational schema 140, and are merely mapped to virtual entities, saving overhead. Second, the ontology author can redesign and adapt virtual ontology 152 as needed at little cost.

For example, for a Person concept corresponding to a relational table Person, CREATE MAPPING links the facts stored in the physical Person table of the relational schema to the virtual table of the ontology schema. Subsequently, querying the virtual table results in a response relating to the physically stored data. If the ontology author declares a Senior_Person inheriting from Person subject to a filter Age>=65, where Senior_Person does not exist in the relational schema, any individuals physically stored in the relational table Person who meet the criterion Age>=65 are mapped to the virtual table for Senior_Person. Client 122 may query Senior_Person and receive a relevant response without needing to create a physical relational table for Senior_Person.

The CREATE MAPPING preserves the architecture and relationships captured in the ontology when mapping data individuals stored in RDBMS 128 to virtual ontology 152. An entity defined for virtual ontology 152 may not correspond to a physical table in the relational schema, but rather to one or more subsets of one or more physical tables via one or more inference rules and relationships. The CREATE MAPPING statement links facts stored in at least one subset of at least one physical table to the virtual table for the ontological entity.

The CREATE MAPPING may also be used to introduce facts explicitly to virtual ontology 152, i.e. facts that are not stored in RDBMS 128. For example, the statement:

```
CREATE MAPPING company-map into Company as SELECT 1 as
Company_ID, XYZ as Name
``` adds a company named XYZ with PK=1 to the concept Company.

Interfacing with the Virtual Ontology

Once virtual ontology 152 has been defined and data individuals have been introduced, ODM emulator 130 presents the ontology schema 148 to client 122 for query. Client 122 may choose to target one of ontology schema 148 based on the ontology capabilities it provides. Since the SQL query may include references to virtual constructs that do not exist in the relational schema of RDBMS 128, SQL transpiler 150 intercepts the SQL query and uses ontology metadata database 146 to rewrite the SQL query as a second SQL query that refers only to the entities of relational schema 140 of RDBMS 128. To capture the ontology capability of the targeted schema in the rewritten (i.e. second) SQL query, SQL transpiler 150 performs a reasoning procedure based on the ODL definitions for the entities targeted by the query (i.e. using the logic corresponding to the targeted one of schemas 148). SQL transpiler 150 interprets the ODL declarations for virtual ontology 152, and applies relational to ontology mappings 144 and any inference rules defined by the ontology author. Consequently, the rewritten query refers to entities of relational schema 140 for RDBMS 128 and is therefore executable by RDBMS engine 138, but nevertheless captures the ontology capability of the targeted one of ontology schemas 148.

SQL transpiler 150 submits the rewritten SQL query for execution by RDBMS engine 138 via virtual-to-physical interface 158, which executes the rewritten query using conventional techniques. SQL transpiler 150 receives the response to the query from RDBMS 128 and presents the response to client 122. In this manner, knowledge base 124 enables client 122 to seamlessly extract ontological knowledge from RDBMS 128 while remaining within a relational platform, both in terms of the physical data storage and the interfacing language (i.e. SQL). Thus client 122 can extract ontological knowledge that is not readily available, and thus opaque with respect to the relational schema for RDBMS 128. Each of ontology schema 148 is associated with a different set of reasoning procedures (i.e. logic), details of which are described herein below.

The Intrinsic Schema

The most fundamental ontology schema presented to client 122 is the intrinsic schema. The intrinsic schema captures only explicitly defined concepts, properties and rules. The intrinsic schema presents to client 122 explicitly defined concepts and properties subject to any rules as virtual relational tables and columns. The virtual tables in the intrinsic schema representing the concepts of virtual ontology 152 include columns for properties that are explicitly defined or inherited. The virtual tables in the intrinsic schema representing the properties of virtual ontology 152 include columns for all the shared properties of the property domain. These are the common properties for all the subjects (i.e. entities) that have that property, and which are determined by taking the intersection of the virtual tables representing the respective subjects.

On receiving a SQL query from client 122, SQL transpiler 150 maps references to ontology entities of virtual ontology 152 to corresponding physical tables and columns of the relational schema for RDBMS 128. SQL transpiler 150 converts the query to refer to the relational schema based on the mappings and rules defined by the ontology author. The link established between the physical data to the entities defined for virtual ontology 152 via the CREATE MAPPING statement is used to determine the corresponding physical tables of RDBMS 128.

To infer knowledge through complex class declarations, SQL transpiler 150 applies set operations, such as union, intersection, filter, and minus to the corresponding physical tables of the relational schema. For example, for the complex concept declaration Mother inheriting from both Women and Parent, Mother will include the union of the physical tables mapped to Women and Parent minus their intersection to avoid redundancies. The results of applying the set operations are presented in the virtual table representing Mother in the intrinsic schema.

Similarly, logic is applied to implement property symmetry, inversion, transitivity, as described above. Once the query has been rewritten to refer to entities of relational schema 140, SQL transpiler 150 provides the converted query to RDBMS engine 138. RDBMS engine 138 executes the query and provides the response to SQL transpiler 150, which provides the response to client 122.

The Exhaustive Schema

The exhaustive ontology schema additionally includes knowledge derivable from the concept hierarchy. Ontologies have implication connectivity, which allows claiming facts about a sub-class entity based on the super-class entity, as described above. Properties of sub-concepts are introduced to the respective super-concepts. The mapping defined by the ontology author links the virtual tables, thus defined, to the physical tables of RDBMS 128, allowing one to access the physically stored facts via the ontology schema.

For example, a parent is defined to have the properties Name, Age and Address. A child inheriting from the parent thus includes Name, Age and Address as well. Additionally, the property School is explicitly declared for the child. The intrinsic virtual tables for the parent and child include only explicitly declared properties. Thus the intrinsic virtual table for the parent includes Name, Age, and Address, and the intrinsic virtual table for the child includes Name, Age, Address and School. However, in the exhaustive schema, the virtual table for parent now includes Name, Age, Address and additionally School, since the school where the child studies is inferable for the parent based on the fact that the child inherits from the parent. Client 122 may query the virtual table for parent in the exhaustive schema to learn which schools parents send their children to.

Similarly, property inheritance is implemented by applying the renaming SQL statement. For example, the properties @Voting_Age and @Driving_Age both inherit from @Age. The exhaustive virtual table for @Age additionally includes virtual columns corresponding to the filters Age>=18 and Age>=16, respectively. By querying the exhaustive virtual table for @Age, client 122 may make inferences about various age limits declared for the virtual ontology.

Relationships also exhibit inheritance. For example, a child relationship SocialMedia_Friend inherits from a parent relationship Friend. SocialMedia_Friend includes an explicitly defined property AccountID that is not defined for Friend, and does not appear in the intrinsic schema for Friend. However, AccountID is inferred for Friend from the inheritance between Friend and SocialMedia_Friend. AccountID is added to the virtual table for Friend in the exhaustive schema by applying the union operator to the physical tables mapped to the ontology entities Friend and SocialMedia_Friend.

The Dereferenced Schema (Graph Traversal)

Graph traversal is an additional ontology capability provided by the disclosed technique to capture relationships defined for virtual ontology 152. Graph traversal is implemented with FKs and the LEFT JOIN statement. The ontology author may define a relationship as one-to-one, one-to-many, and many-to-many. One-to-one and one-to-many relationships are declared with the CREATE CONCEPT and CREATE PROPERTY statements that add the relationship as a property originating from a subject entity and directed to an object entity. The relationship property is implemented with an FK stored in a virtual column in the virtual table representing the subject entity, where the FK points to the related object entity. A relationship may be defined as a general statement between two or more entities that is relevant across the entire schema, or may be defined exclusively for the individuals. For example, the statement: Employee Works_In Company defines a relationship between concepts that is relevant over the entire schema. Conversely, the statement: Joe and Jane are married is specific and relevant only to the individuals Jane and Joe.

To present a relationship between the subject entity and the object entity, the FK for the object entity is added to the virtual table for the subject entity in the exhaustive schema for virtual ontology 152. This effectively connects the subject to the object via a directed branch. On receiving a SQL query from client 122 referencing the FK in the dereferenced schema, SQL transpiler 150 uses the LEFT JOIN statement to add to the query references that could have been accessed by traversing along the directed branch. The references refer to columns in the physical tables of RDBMS 128, and thus the response to the query has the effect of traversing a graph.

Defining One-to-Many Relationships in the Ontology

A property may be a function that returns a value, or a function returning a FK associated with another individual. For example, the statement CREATE PROPERTY Works_In (FK Company) creates a property @Works_In as a function that returns a FK for a Company. The statements:

```
CREATE CONCEPT Employee (Employee_ID, Name, Age, Works_In
  FK company(Company_ID)
  CREATE CONCEPT Company(Company_ID, company_name,
num_employees).
``` creates virtual tables for the concepts Company, and Employee, the latter including virtual columns for the properties Name and Age, and additionally, a virtual column Works_In storing a FK for the company where the employee works. This defines a graph traversal capability between the concepts Employee and Company, which are semantically related by the relationship "Works_In", and implemented with an FK. The special character "." indicates a relationship implemented with an FK as a graph traversal capability between the two related concepts. Subsequently, when viewing the virtual tables for Employee and Company in the ontology schema, client 122 performs a graph traversal with a SQL query:

SELECT*Works_In.Company from Employee where name="Jane".

This retrieves companies that have employees named Jane, effectively traversing from the concept Employee to the concept Company via the relationship "Works_In".

The CREATE MAPPING statement may be used to explicitly add individuals with their corresponding relationships. For example, the statement:

```
CREATE MAPPING Employee-map into Employee AS SELECT 1 as
Person_ID, Sam as Name, 40 as Age, 1 as WORKS IN
```

Adds an employee named Sam with Person_ID=1 to the concept Employee, where Sam is 40 and works in a company having a Company_ID equal to 1.

In the relational world, when adding a row to a table connected to another table via an FK, the new individual introduced by the new row automatically includes a relationship corresponding to the FK. For example, when adding a row to a Person table having fields Name, Age, ID as a primary key, and an FK Best Friend pointing to a primary key for another row, two facts are introduced in one statement. A fact about the new individual being a person and a fact about the new individual having a relationship Best Friend with another individual. However, in a true ontology, these two facts are typically introduced separately. First the new person would be introduced and then a relationship Best Friend would be created for the person. The CREATE MAPPING statement allows the ontology author to define an individual and relationship within the ontology in one statement, bridging between the relational world and the ontology world.

Defining Many-to-Many relationships in the Ontology

In addition to introducing individuals to the ontology, the CREATE MAPPING statement is used to define many-to-many relationships in the concept hierarchy of virtual ontology 152. When used in this context, the CREATE MAPPING statement creates a virtual column in each of the virtual tables representing the two related concepts in the dereferenced schema, each virtual column storing the FK for the other related concept. For example, CREATE MAPPING Friend (Male, Female), creates a virtual column "Friend" in each of the virtual tables for Male and Female. The column Female.Friend stores an FK for the virtual table Male, and column Male.Friend stores an FK for the virtual table Female.

As another example, CREATE MAPPING may be used to map many-to-many data properties. The statements:

```
CREATE CONCEPT Person (person_id, age, name);
CREATE MAPPING emails(person_id REFERENCES
Person(person_id), email string) AS SELECT 1, "jon(@doe.com"
``` define a many-to-many relationship between persons and emails. Subsequently, the query: SELECT id, name, email from dereferenced.Person returns multiple emails for a person.

Graph Traversal Implementation

The dereferenced schema allows accessing knowledge by traversing over virtual ontology 152 as a graph, where the branches of the graph represent relationships between the ontology entities. To implement this ontology capability relationally, the virtual tables of the dereferenced schema includes any columns of other virtual tables that could be reached via graph traversal. Thus, SQL queries directed to these virtual tables return knowledge accessible via graph traversal.

For example, the concept Employee includes the properties Employee_ID, Name, Age and additionally Works_In, which is an FK to the concept Company, where Company has the properties Company_ID, Name, Address. The virtual table for Employee in the dereferenced schema includes the following properties: Employee_ID, Name, Age, Works_In.Company.Company_ID, Works_In.Company.Name, and Works_In.Company.Address. The character "." is used to indicate the graph traversal capability of the dereferenced schema, however this indication is not intended to be limiting and other notations may be used.

Moreover, the properties of Employee may be inferred for Company from the Works_In relationship by traversing the graph in the opposite direction, i.e. from Company to Employee. Graph traversal flowing opposite to the direction defined for the ontology is indicated in the dereferenced schema, for example with the "~" character. The virtual table for Company in the dereferenced schema includes the following columns: Company_ID, Name, Address, —Works_In.Employee.ID, ~Works_In.Employee.Name, ~Works_In.Employee.Age.

Subsequently, a SQL query submitted with respect to the virtual tables of the dereferenced schema accesses information corresponding to traversing between the entities of the ontology as a graph. In a similar manner, many-to-many relationships may be defined and implemented, with the noted difference that two virtual columns are added, one per entity, each virtual column storing FKs for the related entity. It is further to be noted that the dereferenced schema presents virtual tables for concepts and properties. Thus the kernel of a query may be a property entity, allowing one to traverse virtual ontology 152 starting from a property, e.g. select all concepts that have a shared property: SELECT Name from dereferenced.©Age where Age>20 returns the names for Employees and Companies over the age of 20. While the description relates to a graph traversal of one degree, this is not intended to limit the invention. A graph traversal of multiple degrees may be achieved by reiterating the technique multiple times.

SQL transpiler 150 converts a SQL query submitted to the dereferenced schema to the relational schema of RDBMS 128 with the LEFT JOIN statement. The LEFT JOIN is applied to the physical tables mapped to the ontology entities. The LEFT JOIN adds the columns of the physical table mapped to the object concept of the FK. Inferring from a graph traversal expressing a one-to-many relationship requires a single LEFT JOIN statement since there is only one subject entity and one object entity. A graph traversal expressing a many-to-many relationship requires two LEFT JOIN statements, since each entity is both a subject and an object.

Exemplary Implementations

Figure 2A:
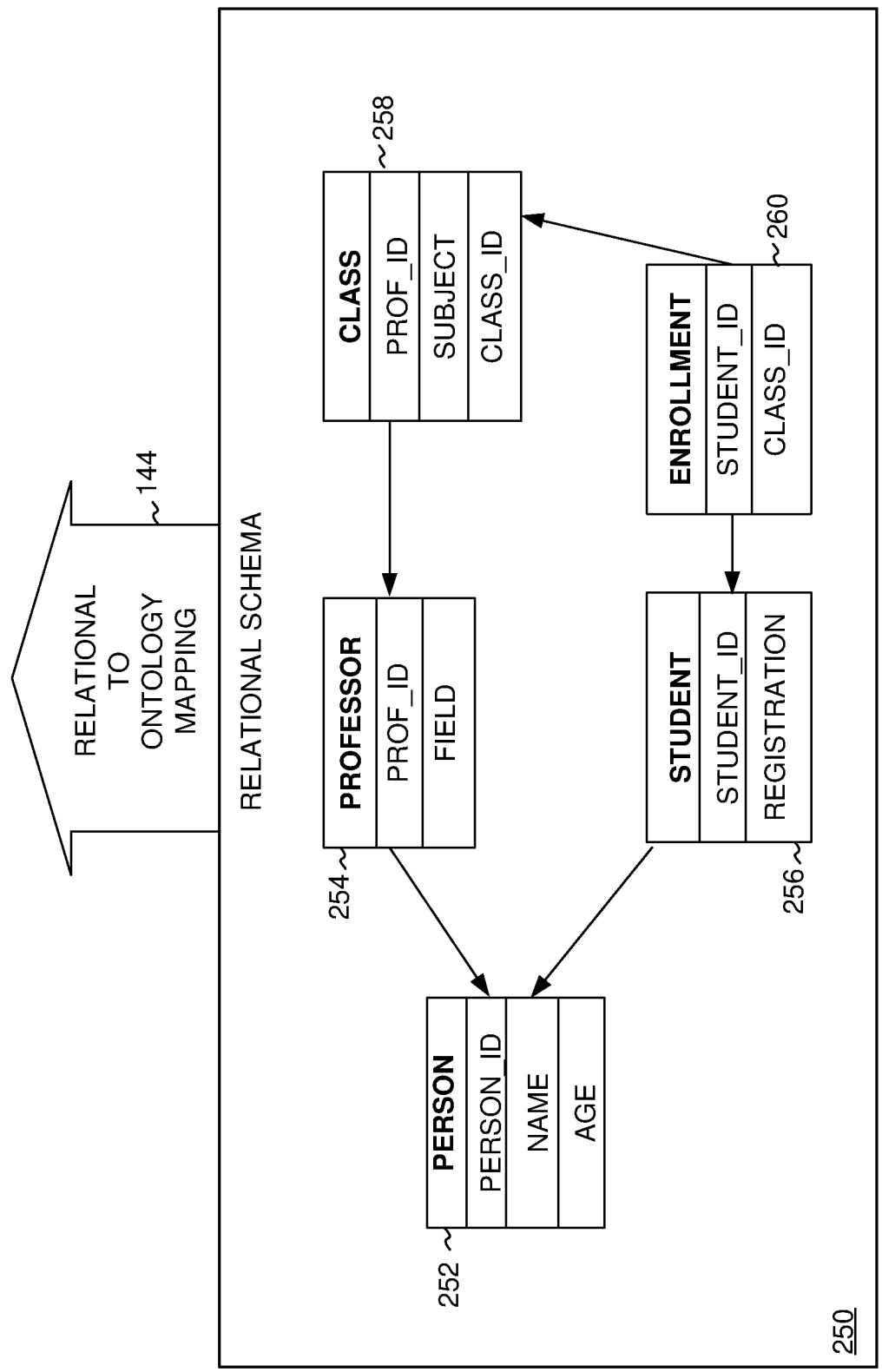
FIGS. 2A-2B, taken together, illustrate a detailed view of an exemplary implementation of a virtual ontology logically overlaid on a relational schema, constructed and operative in accordance with a further embodiment of the disclosed technique.
Figure 2B:
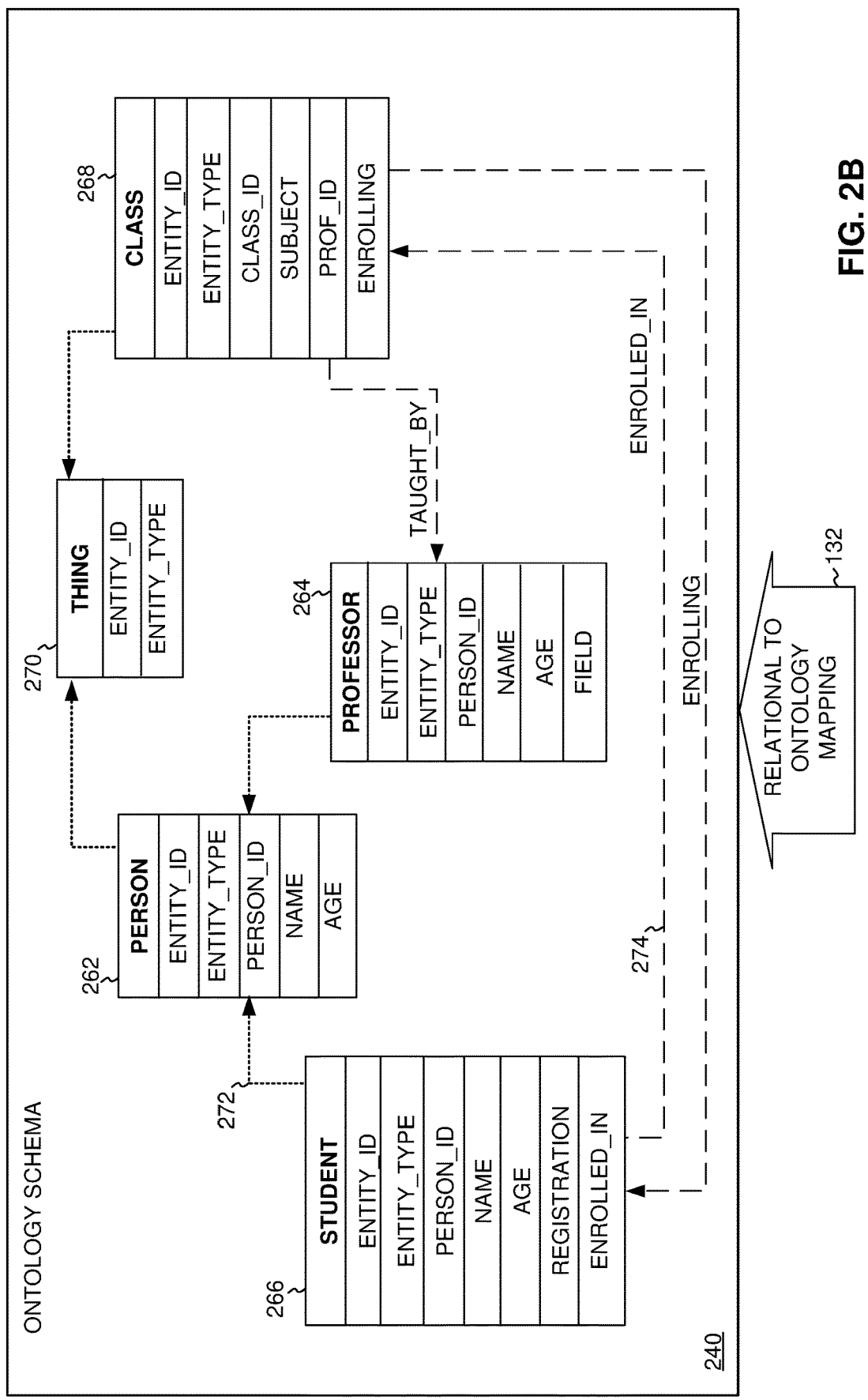

Reference is now made to FIG. 2A-2B, which taken with FIG. 1B, illustrate a detailed view of an exemplary implementation of a virtual ontology 240 logically overlaid on a relational schema 250, constructed and operative in accordance with a further embodiment of the disclosed technique. FIG. 2A illustrates an exemplary implementation of a relational schema 250 for RDBMS 128 of FIG. 1B, and is intended to illustrate an exemplary instance of relational schema 140 of FIG. 1B. FIG. 2B illustrates an exemplary implementation of a virtual ontology schema 240 overlaid on relational schema 250, and implemented by ODM emulator 130 of FIG. 1B. Virtual ontology schema 240 is intended to illustrate an exemplary instance of virtual ontology schema 148 of FIG. 1B.

Referring to FIG. 2A, relational schema 250 includes multiple physical tables stored in RDBMS 128 of FIG. 1B. The tables include a Person table 252, a Professors table 254, a Student table 256, a Class table 258, and an Enrollment table 260. Relational tables 252-260 are implemented according to conventional RDBMS techniques, and include one or more columns describing attributes of individual data items stored within rows of tables 252-260. Each table of relational schema 250 includes a column for storing a primary key for each row, and optionally, one or more columns for storing FKs relating tables to each other.

Person table 252 includes three columns: a unique ID (primary key), a Name, and an Age. Professors table 254 includes a personal identifier, such as Professor ID, and a research field. Student table 256 includes a Student ID and a registration date. Class table 258 includes a Class ID, a subject, and an FK, Professor ID, relating Class table 258 to Professors table 254. Enrollment table 260 includes an FK Student ID relating Enrollment table 260 to Students table 256, and an FK Class ID relating Enrollment table 260 to Class table 258. Enrollment table 260 is a link table expressing a many-to-many relationship between individual Students and Classes, since each student may be enrolled in several classes, and each class has many students. Since each student can be enrolled in a given class only once, the primary key of Enrollment table 260 is the combination of Student ID and Class ID.

Notably, relational schema 250 does not exhibit any hierarchy between tables 252-260, and thus does not capture the inheritance characteristic of ontologies. Moreover, the relationships between tables 252-260, implemented through foreign and primary keys, may or may not capture semantically relevant information, and do not readily facilitate "skipping" from one table to another in either direction, as would a graph traversal capability characteristic of an ontology.

As differentiated from relational schema 250, where data are related via primary and FKs in a low dimensional schema (i.e. flat 2D schema), virtual ontology 240 is structured as a higher dimensional hierarchical tree of concepts, (i.e. having 3D depth) that enables inferring semantic meaning from data through ontological capabilities, such as inheritance and graph traversal.

Referring to FIG. 2B, virtual ontology 240 is overlaid on relational schema 250 of FIG. 2A to provide a client, such as client 122, with ontology capabilities, such as inheritance and graph traversal, all implemented with relational constructs and syntax. At the topmost node of virtual ontology 240 sits a super-concept, Thing 270 having a uniquely identifying entity_ID, which is a calculated field, and an entity_Type. All the other concepts of virtual ontology 240 inherit from Thing 270, and thus include entity_ID, and entity_Type properties. The entity ID for each concept is generated by combining the entity_Type for the concept with the primary key.

To create the ontology properties and concepts, the ODL instruction CREATE PROPERTY and CREATE CONCEPT create a virtual table for each entity, respectively. A different version of the virtual table is subsequently presented to client 122 in each ontology schema, each including columns that express various different ontological capabilities. Consequently, client 122 may query virtual ontology 240 with respect to concepts or properties.

In the following example, each relational table and column of relational schema 250 has a corresponding concept and property in virtual ontology 240, respectively, however this is not required. The design of virtual ontology 240 is left to the discretion of the ontology author and the correspondence does not have to be one-to-one. Thus Person table 252, Professor table 254, Student table 256 and Class table 258 each have a corresponding concept, e.g. Person concept 262, Professor concept 264, Student concept 266 and Class concept 268, respectively. Similarly, the relational columns Name, Age, Field, Registration, Subject, Class_ID, and Student_ID are properties of virtual ontology 240 represented by virtual tables in each of the intrinsic, exhaustive, and dereferenced schema, described below. As ontology entities, the concepts and properties capture the ontological capabilities of virtual ontology 240. Notably, Enrollment 260 does not have a corresponding property as this is implemented as a graph traversal, described in greater detail below.

The ODL statement CREATE PROPERTY Name (Name string) and CREATE PROPERTY Age (Age int) declares the properties Name of type string, and Age of type int, which are valid across virtual ontology 240. A virtual table is created for each of Name and Age. The ODL statement CREATE CONCEPT Person Inherits Thing (Person_ID, Name, Age) creates a virtual table for Person concept 262 inheriting entity_ID and entity_Type from Thing 270 having columns for Person_ID as a PK, Name and Age, declared above. The ODL statement CREATE CONCEPT Professor Inherits Person (Research Field) and CREATE CONCEPT Student Inherits Person (Registration Date) create virtual tables for Professor concept 264 and Student concept 266, respectively. Each of Professor concept 264 and Student concept 266 inherit all the properties of Person concept 262. Professor concept 264 additionally includes Research Field, and Student concept 266 additionally includes a Registration Date. The inheritance is depicted in FIG. 2B with small-dashed arrows, such as arrow 272 connecting Student concept 266 with Person concept 262. Inheritance reflects an "IS A" relationship, and semantically, Person IS A Thing, Professor IS A Person, and Student IS A Person. The virtual tables for the properties Name and Age include any properties common to all the subjects for which Name and Age have been declared as properties, respectively, details of which are provided below with respect to FIGS. 3, 4, and 5A-5D.

Relationships for graph connectivity are depicted with large-dashed arrows, such as arrow 274 labelled Enrolled_In connecting Class concept 268 with Student concept 266. A one-to-many relationship may be defined by declaring a property as an FK. For example, the ODL statement, CREATE CONCEPT Class Inherits Thing (Class_ID, Subject, Taught_By references Professor(Person_ID), creates a virtual table for Class concept 268 inheriting entity_ID and entity_Type from Thing 270, and additionally including Class_ID, Subject, and Taught_By.Professor.Prof_ID as properties. Class_ID and Subject store values, whereas Taught_By.Professor.Prof_ID is an FK linking Class concept 268 to Professor concept 264 via the many-to-one relationship "TAUGHT BY" (e.g. each class is taught by one professor but a professor may teach many classes). Semantically, a class is TAUGHT BY a professor. A Professor TEACHES a class.

The many-to-many relationship captured by the reference table Enrollment 260 is added to virtual ontology 240 with the following CREATE MAPPING statement:

```
CREATE MAPPING M1 (enrolling FOREIGN KEY REFERENCES
student(person_id), enrolled_in FOREIGN KEY REFERENCES
class(class_id)) AS SELECT student_id as enrolling, class_id as
enrolled_in FROM enrollment
``` declares two FKs, one for each of Class concept 268 and Student concept 266. Class concept 268 includes the FK Enrolling.Student.Student_ID linking Class concept 268 to Student concept 266 via the relationship "Enrolling", i.e. semantically, a Class has an Enrolling Student. Student concept 266 includes the FK Enrolled_In.Class.Class_ID linking Student concept 266 to Class concept 268 via the relationship Enrolled_In, i.e. semantically, a Student is Enrolled_In a Class.

Once the structure of virtual ontology 240 is defined as an abstraction overlaid on relational schema 250, the data physically stored in RDBMS 128 of FIG. 1B is linked to the entities of virtual ontology 240 via a map created with the CREATE MAPPING statement. This enables targeting queries formulated for virtual ontology 240 to the physical data stored in RDBMS 128. The CREATE MAPPING instruction introduces the individuals from RDBMS 128 to virtual ontology 240. For example, CREATE MAPPING Map_Person( ) Into Person as SELECT ID, Name, Age from DB.Person introduces the individuals stored in physical columns ID, Name and Age of Person table 252 to Person concept 262. Individuals are similarly introduced to Student concept 266, Professor concept 264, and Class concept 268, respectively. The reference table Enrollment 260 (FIG. 2A) was implemented as a many-to-many relationship with the CREATE MAPPING statement which added FKs to the corresponding virtual tables which are presented in the dereferenced schema.

Intrinsic Schema

Figure 3A:
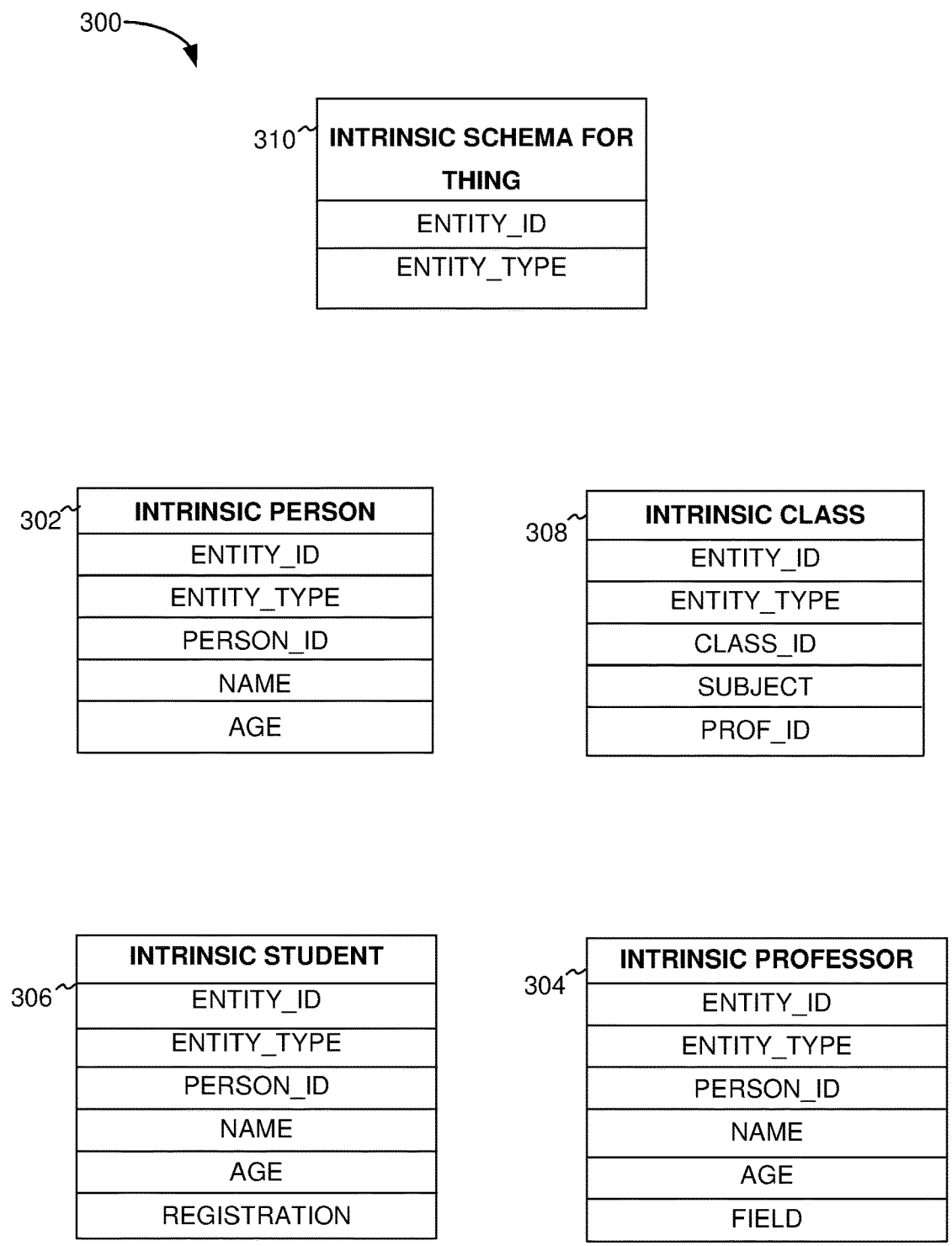

Reference is now made to FIGS. 3A-3C which, taken together with FIGS. 2A-2B, illustrate an intrinsic schema 300 of virtual ontology 240 of FIG. 2B, constructed and operative in accordance with another embodiment of the disclosed technique. Intrinsic schema 300 for virtual ontology 240 presents explicitly declared aspects for the entities of virtual ontology 240. FIG. 3A shows the intrinsic virtual tables for the concepts, and FIGS. 3B-3C shows the intrinsic virtual tables for the properties.

The virtual table for a concept includes only properties that were explicit defined by the ontology author. These include properties acquired when creating the concept, as well as properties acquired explicitly through defined rules.

Referring to FIGS. 2B and 3A, Thing 270 is represented by intrinsic Thing 310 with built-in properties entity_ID and entity_Type. Person concept 262 is represented by intrinsic Person 302 with properties entity_ID and entity_Type inherited from Thing 270, and Person_ID, Name and Age explicitly declared for Person concept 262. Class concept 268 is represented by intrinsic Class 308 with properties entity_ID and entity_Type inherited from Thing 270, as well as Class_ID, Subject, and Professor ID explicitly declared for Class concept 268. Professor concept 264 is represented by intrinsic Professor 304 with properties entity_ID, entity_Type, Person_ID, Name, and Age inherited from Person concept 262, as well as Research field explicitly declared for Professor concept 264. Student concept 266 is represented by intrinsic Student 306 with properties entity_ID, entity_Type, Person_ID, Name, and Age inherited from Person concept 262, as well as Registration Date explicitly declared for Student concept 266.

Referring to FIGS. 2B, 3B-3C, intrinsic schema 300 additionally presents virtual tables for each property of virtual ontology 240. The virtual table representing a given property includes columns for all the shared properties of the domain of the given property, that is, any properties that are common to subjects declared with the given property. The columns are determined as the intersection of the properties declared for the subject of the given property. Since all concepts have the properties entity_ID and entity_Type, these are included in the virtual table for each property as well.

Beginning with the properties for Person concept 262, Intrinsic @Name 312 includes Name and additionally Person_ID and Age, which are common concepts declared with the property Name. Similarly, intrinsic @Age 314 includes Age and additionally Person_ID and Name, which are common concepts declared with the property Age. Intrinsic @Field 316, intrinsic @Subject 318, and intrinsic @Registration 320 are identical to intrinsic Professor 304, intrinsic Class 308, and intrinsic Student 306, respectively, since no other concepts have these properties and the intersection is trivial.

Exhaustive Schema

Figure 4C:
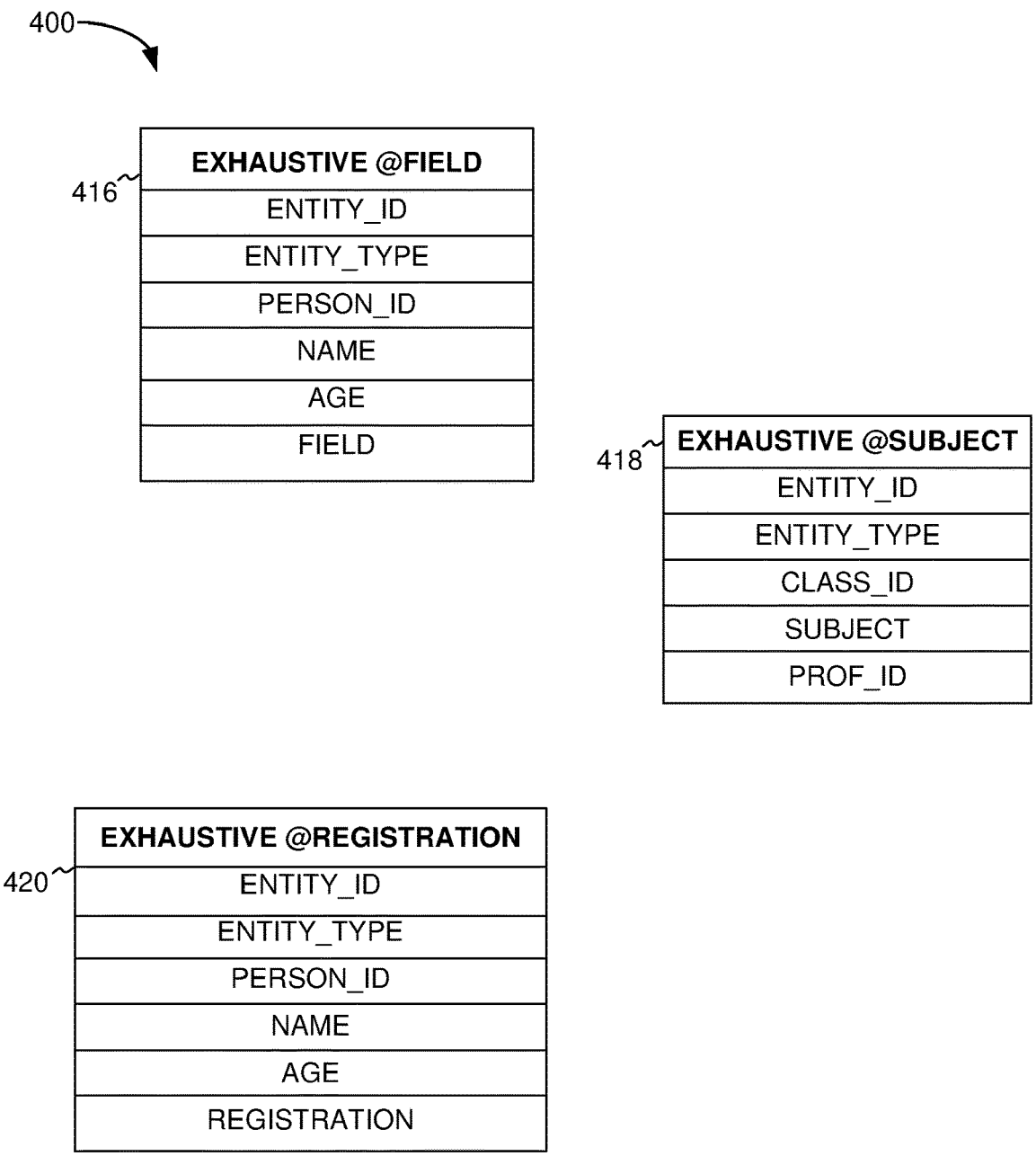

Reference is now made to FIGS. 4A-4C which, taken together with FIGS. 2A-2B, illustrates an exhaustive schema 400 of virtual ontology 240, constructed and operative in accordance with a further embodiment of the disclosed technique. Whereas intrinsic schema 300 (FIGS. 3A-3C) includes only formally declared properties and relationships, exhaustive schema 400 additionally captures the properties and relationships derived from the underlying sub-concepts and sub-properties in the hierarchy of the entities. FIG. 4A illustrates the exhaustive virtual tables for the concepts of virtual ontology 240, e.g. exhaustive Thing 410, exhaustive Person 402, exhaustive Professor 404, exhaustive Student 406, and exhaustive Class 408. These include all columns declared explicitly for each concept, and additionally columns derived from the descendants of the concept. FIGS. 4B-4C illustrate the exhaustive virtual tables for the properties of virtual ontology 240, e.g. exhaustive @Name 412, exhaustive @Age 414, exhaustive @Field 416, exhaustive @Subject 418, and exhaustive @Registration 420 which include shared properties of any concept declared with the property, and descendants.

Referring to FIGS. 2B and 4A, SQL transpiler 150 (FIG. 1B) adds properties defined for sub-concepts to the respective super-concepts. Beginning from the bottom of the concept hierarchy, Professor concept 264, Student concept 266 and Class concept 268 do not have any concepts inheriting there from, and these are identical to intrinsic Professor 304, intrinsic Student 306 and intrinsic Class 308 (FIG. 3A).

Climbing up the concept hierarchy, Person concept 262 has two inheriting sub-concepts, Professor concept 264 and Student concept 266. The properties explicitly declared for these sub-concepts, e.g. Research Field and Registration, are added to the virtual table for Exhaustive Person 402. Notably, these properties would not be inferable from relational schema 250 since this lacks hierarchy.

At the top of the concept hierarchy, Thing concept 270 has five inheriting sub-concepts. All the intrinsic properties of Person concept 262, Professor concept 264, Student concept 266, and Class concept 268 are inferable for Thing 270 from the concept hierarchy. Querying virtual ontology 240 with respect to exhaustive schema 400 allows client 122 to access properties and relationships derivable from sub-concepts and sub-properties throughout the concept hierarchy. For example, querying exhaustive Person schema 402 allows accessing the Registration Date and Research Fields of individual students and professors, respectively, mapped to Person concept 262. Since exhaustive Person schema 402 is implemented with a virtual relational table, the queries may be formulated in standard SQL syntax.

Referring to FIGS. 4B-4C, exhaustive schema 400 presents properties to include all columns from concepts for which the property is defined. In this example, the virtual tables for exhaustive @Field 416, exhaustive @Subject 418, and exhaustive @Registration 420 are the same as for virtual tables 316-320 of intrinsic schema 300, respectively. However, exhaustive @Name and exhaustive @Age additionally include columns for registration and field, inferred from the hierarchy.

Dereferenced Schema

Figure 5D:
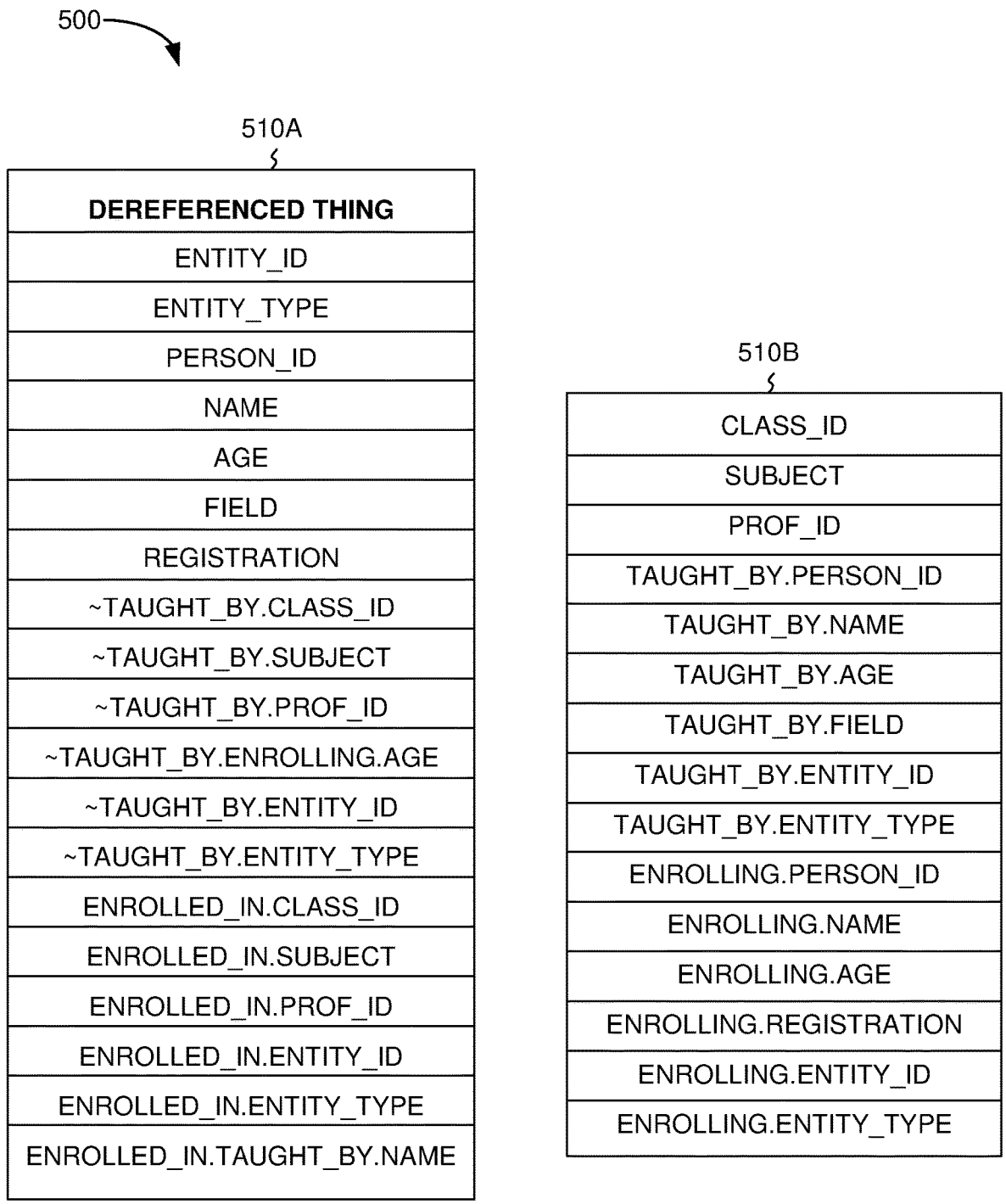

Reference is now made to FIGS. 5A-5D which, taken together with FIGS. 2A-2B, illustrates a dereferenced schema 500 capturing the graph traversal capability of virtual ontology 240, constructed and operative in accordance with another embodiment of the disclosed technique. Dereferenced schema 500 allows client 122 to effectively traverse over virtual ontology 240 as a graph by including virtual columns in the respective virtual tables that express relationships between the ontology entities. The example that follows illustrates a graph traversal depth of 1, however this is not intended to limit the invention, and the disclosed technique may be applied to achieve n degrees of traversal. Furthermore, only some of the properties accessible via the graph traversal are depicted, for the purpose of clarity. FIG. 5A illustrates a virtual table for dereferenced Class 508, FIG. 5B illustrates virtual tables for dereferenced Professor 504 and dereferenced Student 506, FIG. 5C illustrates a virtual table for dereferenced Person 502, and FIG. 5D illustrates a virtual table for dereferenced Thing 510.

Referring to FIGS. 2B and 5A, dereferenced Class 508 includes explicitly defined properties, and properties inferable through inheritance (i.e. intrinsic schema) and from the concept hierarchy (i.e. exhaustive). Additionally, dereferenced Class 508 captures the many-to-one relationship "Taught_By" declared between Class concept 268 and Professor concept 264, implemented with an FK to Professor concept 264. Dereferenced Class 508 allows client 122 to "see" all the properties of Professor concept 264 from dereferenced Class 508, as though client 122 were effectively traversing from Class concept 268 to Professor concept 264 along the branch "Taught_By" by including those properties in dereferenced Class 508. Properties accessible via graph traversal are indicated with the "." character appended to the respective relationship, indicating to client 122 the semantic meaning behind the relationship. Accordingly, dereferenced Class 508 additionally includes the columns Taught_By. Person_ID, Taught_By. Name, Taught_By.Age, and Taught_By. Field. Dereferenced Class 508 additionally includes Taught_By.Entity_ID, and Taught_By.Entity_Type. Client 122 queries dereferenced Class 508 directly to access the properties of Professor concept 264 via the relationship "Taught_By", effectively traversing a graph within a SQL environment.

In a similar manner, the relationship Enrolling declared between Student concept 266 and Class concept 268 is expressed in dereferenced Class 508 as Enrolling.Person_ID, Enrolling. Name, Enrolling.Age, and Enrolling. Registration, as well as Enrolling.Entity_ID and Enrolling.Entity_Type. Client 122 may query dereferenced class 508 directly to access the properties of Student concept 266, as though traversing from Class concept 268 to Student concept 266 along the branch "Enrolling".

Referring to FIG. 5B, dereferenced Professor 504 includes explicitly defined properties Entity_ID, Entity_Type, Person_ID, Name, Age, and Research Field. Additionally, dereferenced Professor 504 captures the many-to-one relationship "Taught_By" declared between Class concept 268 and Professor concept 264. Client 122 can access the properties of Class concept 268, e.g. from dereferenced Professor 504 as though traversing from Professor concept 264 to Class concept 268 in reverse to the declared relationship "Taught_By". The reversal of the declared direction is indicated, for example with a "~" character. Dereferenced Professor 504 includes virtual columns ~Taught_By.Class_ID, ~Taught_By. Subject, ~Taught_By.Prof_ID, ~Taught_By.Entity_ID and ~Taught_By.Entity.Type corresponding to the explicitly declared properties of Class concept 268, and additionally, —Taught_By.Enrolling.Age. The last column allows client 122 to traverse along two branches: from Professor concept 264 to Class concept 268 along Taught_By, and to Student concept 266 along Enrolling.

Dereferenced Student 506 includes explicitly defined properties Entity_ID, Entity_Type, Person_ID, Name, Age, and Registration Date, and properties accessible via the relationship "Enrolled_In" between Student concept 266 and Class concept 268. This allows client 122 to "see" the properties of Class concept 268 as though traversing along the branch "Enrolled_In". Additionally, the property Enrolled_In.Taught_By.Name is presented allowing client 122 to traverse along a second branch, Taught_By. The user may query for this property of dereferenced Student 506 for all the professors that teach students named "Sam", effectively traversing from Student concept 266 to Class concept 268 and then to Professor concept 264:

SELECT 'Enrolled_in.Taught_By.Name' from Dereferenced. Student where name='Sam'

Referring to FIG. 5C, dereferenced Person 502 includes properties and relationships derived from the class hierarchy (i.e. exhaustive schema) and graph traversal. Accordingly, dereferenced Person 502 includes properties and relationships of dereferenced Professor 504 and dereferenced Student 506 derivable from the class hierarchy declared for virtual ontology 240. Querying dereferenced Person 502 allows client 122 to infer knowledge from the concept hierarchy, and additionally via graph traversal.

Referring to FIG. 5D, dereferenced Thing 510A-510B includes all the properties and relationships inferable through inheritance and graph traversal in virtual ontology 510. This includes any properties and relationships explicitly defined for the concepts of virtual ontology 240, as well as any properties and relationships inferable through graph traversal. Dereferenced Thing 510A-510B is split into two columns for reasons of layout only.

In a similar manner, dereferenced virtual tables are presented for the properties of virtual ontology schema 240, similar to Tables 416, 418, and 420 of Exhaustive schema for Field, Subject and Registration, respectively. Each virtual table includes all the properties of all the subjects for which this property is declared, as well as their relationships. For example, since Age appears in Person concept 262, Professor concept 264, and Student concept 266, dereferenced @Age (not shown) would be identical to dereferenced Person 502.

On receiving a query relating to the graph traversal capability, SQL transpiler 150 rewrites the query for relational schema 250 using the LEFT JOIN statement to add the respective physical columns of the physical tables of RDBMS 128.

For example, client 122 may query dereferenced Student 506 of dereferenced schema 500 for all the classes that include a student by the name of "Sam', since the names of student are now included with respect to the relationship Enrolled_In:

---
SELECT 'Enrolled_in.Subject' from Dereferenced.Student where name = 'Sam'

---

Although this relationship is not directly defined in relational schema 250, it is inferred from virtual ontology 240. SQL transpiler 150 intercepts the query and identifies references unique to virtual ontology 240. To rewrite the query for execution by RDBMS 128, SQL transpiler 150 uses the mapping between Class table 258 and Class concept 268, and Student table 256 and Student concept 266. Additionally, SQL transpiler 150 identifies the Enrolled_In relationship and converts this to the corresponding FKs defined for relational schema 250, e.g. via Enrollment table 260. SQL transpiler 150 rewrites the Enrolled_in relationship between Student concept 266 and Class concept 268 using a LEFT JOIN SQL instruction, which effectively implements the graph traversal. The relational query is rewritten as follows, with respect to relational schema 250:

---
SELECT P.NAME as 'ENROLLED_IN_in[Class].Subject'
FROM Student S
LEFT JOIN Person P ON S.ID = P.ID
LEFT JOIN Enrollment ON P.ID = E. Student_ID
LEFT JOIN Class C ON C.Class_ID = E.Class_ID
WHERE P.NAME = 'SAM'

---

Since the relationship between Class concept 268 and Student concept 266 is many-to-many, the rewritten query includes two LEFT JOIN statements. Executing these SQL instructions via RDBMS 128 returns a response equivalent to traversing from Student concept 266 to Class concept 268 for Students named "Sam". However, from the perspective of client 122, the query is a single and relatively simple SQL query. SQL transpiler 150 automates this process, allowing client 122 to submit straightforward SQL queries with respect to dereferenced schema 500 to effectively extract knowledge via graph traversal.

To traverse through two FKs:

---
SELECT 'Enrolled_in.Taught_By.Name' from Dereferenced.Student where name = 'Sam'

---

This query effectively traverses from Student concept 266 to Class concept 268 via "Enrolled In" incurring two LEFT JOIN statements, and from Class concept 268 to Professor concept 264 via "Taught By" relationship incurring another LEFT JOIN. SQL transpiler 150 intercepts the query and rewrites the query with respect to relational schema 150 of RDBMS 128 as follows:

---
SELECT P2.NAME as 'ENROLLED_IN.TAUGHT_BY.Name'
FROM Students S
LEFT JOIN Person P1 ON S.ID = P1.ID
LEFT JOIN Enrollment E ON P1.ID = E. Student_ID
LEFT JOIN Class C ON E.CLASS_ID = C.Class_ID
LEFT JOIN Person P2 ON C.Professor_ID = P2.ID
WHERE P.NAME = 'SAM'

---

In a similar manner, client 122 may query dereferenced Professor 504 to effectively perform a graph traversal along the branch ~Taught_By from Professor concept 264 to Class concept 268. SQL transpiler 150 rewrites the query for execution by RDBMS 128.

Typically, relational databases cannot store multiple values for an attribute in a single column of a table, and therefore multiple values for a single attribute are stored in a different table, which is referenced using an FK. For example, if Person concept 262 additionally has an Email property, since a person may have multiple email addresses, this would be physically stored in relational schema 250 in a separate Person_Email table (not shown) linked to Person table 252 with an FK (e.g. Person_ID). This may be defined in the relational schema as follows:

---
Person table with Person_ID, Name, Age
Person_Email table with Person_ID, Email

---

The ontology author uses the CREATE MAPPING to map this relationship and create the necessary FKs in virtual ontology 240 with the following ODL statement:

---
CREATE MAPPING m1(person_id, email FOREIGN KEY (person_id) REFERENCES Person (Person_ID)) AS SELECT person_ID, Email FROM Person_Email;

---

Since ontologies are not restricted by multiple values, the relationship between Person and Email would be expressed as another column in dereferenced Person 502 for Person concept 262. Additionally, a reference to dereferenced Person 502 is added to the Person_email table of relational schema 250. For the following query:
  SELECT Name, Email from Dereferenced.Person where Name='Sam'
  SQL transpiler 150 infers the relationship between Person concept 162 to the Person_Email table from the Person Email property of dereferenced Person 502 and rewrites the query for RDBMS 128 as:

```
SELECT Name, Email FROM Person P
LEFT JOIN Person_Email P ON P.Person_ID = P.Person_ID WHERE
P.name = 'Sam
```

Figure 6:
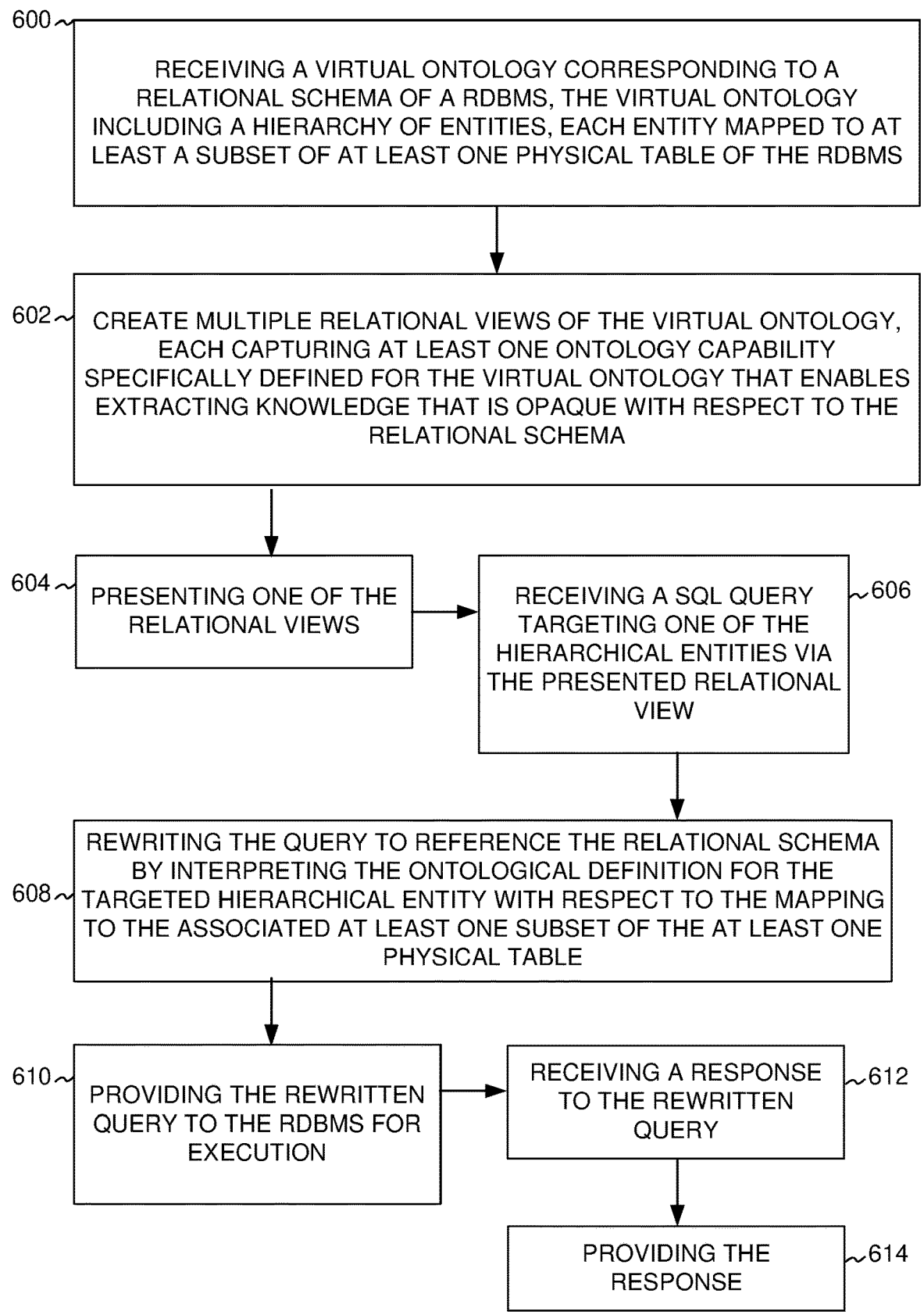
FIG. 6 is a schematic illustration of a method for creating an ODM emulator overlaid on a relational database, operative in accordance with a further embodiment of the disclosed technique.

Reference is now made to FIG. 6, which is a schematic illustration of a method for creating an ODM emulator overlaid on a relational database, constructed and operative in accordance with a further embodiment of the disclosed technique.

In procedure 600 a virtual ontology of multiple candidate virtual ontologies, corresponding to a relational schema representing multiple physical tables of a relational database system, is received. The virtual ontology comprises a hierarchy of multiple ontology entities, each associated with at least a subset of at least one of the multiple physical tables via a mapping introducing data items stored in the relational database system to the virtual ontology.

With reference to FIGS. 1B and 2A-2B, SQL transpiler 150 receives virtual ontology 240 corresponding to relational schema 250. Relational schema 250 represents multiple physical tables of RDBMS 128. Virtual ontology 240 comprises a hierarchy of multiple ontology entities, e.g. Thing concept 270, person concept 262, Professor concept 264, Student concept 266, and Class concept 268, that are each associated with at least a subset of at least one of physical tables 252, 254, 256, 258, and 260 via relational to ontology mapping 144. Relational to ontology mapping 144 introduces the data items stored in RDBMS 128 to virtual ontology 240.

In procedure 602, multiple relational views are created for the virtual ontology, each relational view capturing at least one ontology capability defined specifically for the virtual ontology, (i.e. the relational schema, as defined in the relational world, does not provide this capability), and that enables extracting knowledge from the introduced data items that is opaque with respect to the relational schema.

With reference to FIGS. 3A-3C, SQL transpiler 150 (FIG. 1B) creates intrinsic schema 300, which is a relational view of virtual ontology 240 (FIG. 2B). Intrinsic schema 300 includes virtual tables 302-320 corresponding to the entities of virtual ontology 240, and captures an inheritance capability defined specifically for virtual ontology 240, (i.e. relational schema 250 does not provide the inheritance capability). This enables extracting knowledge that is opaque with respect to relational schema 250. For example, the name property of intrinsic person 302 can be queried to extract shared information about both students and professors.

With reference to FIGS. 4A-4C, SQL transpiler 150 (FIG. 1B) creates exhaustive schema 400, which is another relational view for virtual ontology 240. Exhaustive schema 400 includes virtual tables 402-420 corresponding to the entities of virtual ontology 240, and captures the knowledge derived from the hierarchy defined specifically for virtual ontology 240, (i.e. relational schema 250 does not provide the hierarchical capability). For example, exhaustive Person 402 may be queried for field and registration, defined explicitly for Professor concept 264 and Student concept 266, respectively.

With reference to FIGS. 5A-5D, SQL transpiler 150 (FIG. 1B) creates dereferenced schema 500, which is a third relational view for virtual ontology 240. Dereferenced schema 500 includes virtual tables 502-510 corresponding to the entities of virtual ontology 240, and which capture the graph traversal capability defined specifically for virtual ontology 240, (i.e. relational schema 250 does not provide the graph traversal capability). For example, dereferenced Professor 504 may be queried for the property ~Taught_By.Subject to access individuals stored in class concept 268, effectively traversing from Professor concept 264 to class concept 268 in reverse to the defined relationship.

In procedure 604, one of the relational views is presented. With reference to FIGS. 5A-5D, SQL transpiler 150 presents dereferenced schema 500 to client 122 via I/O 106 (FIG. 1A) as a relational view of virtual ontology 240.

In procedure 606, a query formulated in the relational query language targeting one of the ontology entities via the presented relational view, is received. With reference to FIGS. 5A-5D, SQL transpiler 150 receives a SQL query targeting dereferenced Student 506 from client 122 via I/O 106, e.g.:

```
SELECT 'Enrolled_in.Subject' from Dereferenced.Student
where name = 'Sam'
```

In procedure 608, the query is rewritten to reference the relational schema by interpreting an ontological definition for the targeted ontology entity with respect to the mapping to the associated at least one subset of the at least one physical table. With respect to FIGS. 2A-2B and 5B, SQL transpiler 150 (FIG. 1B) interprets the ODL declaration for Student concept 266 and Class concept 268 with respect to relational to ontology mapping 144, which associates these ontology concepts with Student table 256 and Class table 258 of relational schema 250, to rewrite the SQL query with respect to relational schema 250, e.g.:

```
SELECT P.NAME as 'ENROLLED_IN_in[Class].Subject'
FROM Student S
LEFT JOIN Person P ON S.ID = P.ID
LEFT JOIN Enrollment ON P.ID = E. Student_ID
LEFT JOIN Class C ON C.Class_ID = E.Class_ID
WHERE P.NAME = 'SAM'
```

In procedure 610, the rewritten query is provided to the relational database system for execution. With respect to FIG. 1B, SQL transpiler 150 provides the rewritten SQL query to RDBSM 128 for execution by RDBMS engine 138.

In procedure 612, a response to the rewritten query is received. In some embodiments, the response includes the knowledge that was otherwise opaque. With respect to FIG. 1B, SQL transpiler 150 receives a response to the rewritten SQL query, e.g. all the classes that include a student named "Sam".

In procedure 614, the response is provided. With respect to FIGS. 1A-1B, SQL transpiler 150 provides the response to client 122 via I/O 106, thereby extracting knowledge regarding all classes that include students named "Sam" to client 122, where this knowledge could not be extracted by querying relational schema 250 (FIG. 2A) directly.

In some embodiments, the multiple ontology entities include at least one ontology concept.

In some embodiments, the multiple ontology entities include at least one ontology property.

In some embodiments, the at least one ontology capability captured by a first one of the multiple relational views is explicitly defined for the virtual ontology.

In some embodiments, the at least one ontology capability is an inheritance capability implemented with a union operation.

In some embodiments, the at least one ontology capability captured by a second one of the multiple relational views corresponds to the hierarchy of the multiple ontology entities.

In some embodiments, the at least one ontology capability captured by a third one of the relational views is a graph traversal capability expressing a relationship between two of the multiple ontology entities.

In some embodiments, the graph traversal capability is implemented with a left join operation.

In some embodiments, the relationship is defined exclusively for the virtual ontology.

In some embodiments, the graph traversal capability enables traversing in reverse to a direction defined for the relationship.

In some embodiments, the at least one ontology capability is selected from the group consisting of: property transitivity, property symmetry, property inversion, and an explicitly defined inference rule.

Figure 7:
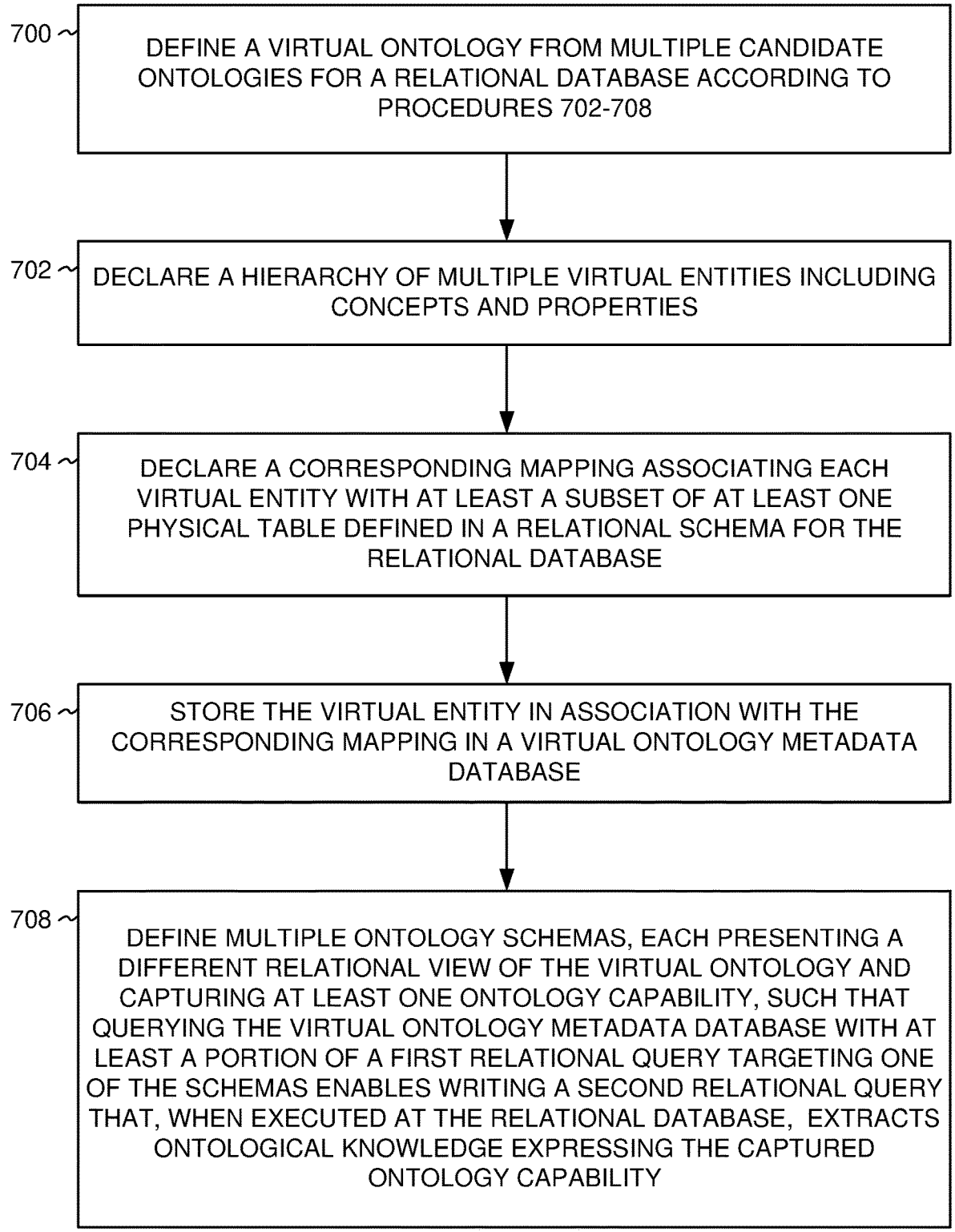
FIG. 7 is a schematic illustration of a method for implementing a virtual ontology over a relational database, operative in accordance with another embodiment of the disclosed technique.

Reference is now made to FIG. 7, which is a schematic illustration a method for implementing a virtual ontology over a relational database, constructed and operative in accordance with another embodiment of the disclosed technique.

In procedure 700 a virtual ontology is defined from multiple candidate ontologies for a relational database according to procedures 702 to 708. With reference to FIG. 1B, virtual ontology 152 is defined from multiple candidate ontologies for RDBMS 128.

In procedure 702, a hierarchy of multiple virtual entities is declared. The multiple virtual entities include concepts and properties, where each concept includes at least one property. With reference to FIG. 2B, ontology schema 240 is declared as a hierarchy of multiple virtual concepts 262-270 and properties, shown as fields for each concept.

In procedure 704, for each virtual entity in the hierarchy, a corresponding mapping is declared associating the virtual entity with at least a subset of at least one physical table defined in a relational schema of the relational database. The mapping introduces data stored in the relational database to the virtual ontology. With reference to FIG. 1B, relational to ontology mappings 144 are declared associating each virtual entity of virtual ontology 152 with at least a subset of at least one physical table of relational schema 140.

In procedure 706, the virtual entity is stored in association with the corresponding mapping in a virtual ontology metadata database implemented as a relational database. With reference to FIGS. 1B and 2B, virtual concepts 260-270 and their corresponding virtual fields (i.e. rows) are stored in association with relational-to-ontology mappings 144 at ontology metadata database 146. Ontology metadata database 146 is implemented as a relational database.

In procedure 708, multiple ontology schemas are defined, each implemented as a different relational view of the virtual ontology and capturing at least one ontology capability. Querying the ontology metadata database with at least a parsed portion of an intercepted first relational query targeting one of the ontology schemas enables rewriting the first relational query as a second relational query. Executing the second relational query at the relational database enables extracting ontological knowledge from the data that is opaque with respect to the relational schema and which expresses the ontology capability captured by the targeted ontology schema. This enables extracting the ontological knowledge within a relational framework. With reference to FIGS. 3A-3C, the intrinsic schema 300 capturing the hierarchy of the virtual ontology is shown. With reference to FIGS. 4A-4C, the exhaustive schema 400 additionally capturing an inheritance capability is shown. With reference to FIGS. 5A-5D, the dereferenced schema 500 is shown additionally capturing a graph traversal capability. Querying ontology metadata database 146 with at least a parsed portion of an intercepted SQL query from client 122 targeting one of ontology schemas 148 enables rewriting the intercepted SQL query as a second SQL query for RDBMS 128. Executing the second SQL query at RDBMS 128 enables extracting ontological knowledge from the data that is opaque with respect to relational schema 140 and which expresses the ontology capability captured by the targeted one of ontology schemas 148.

Figure 8:
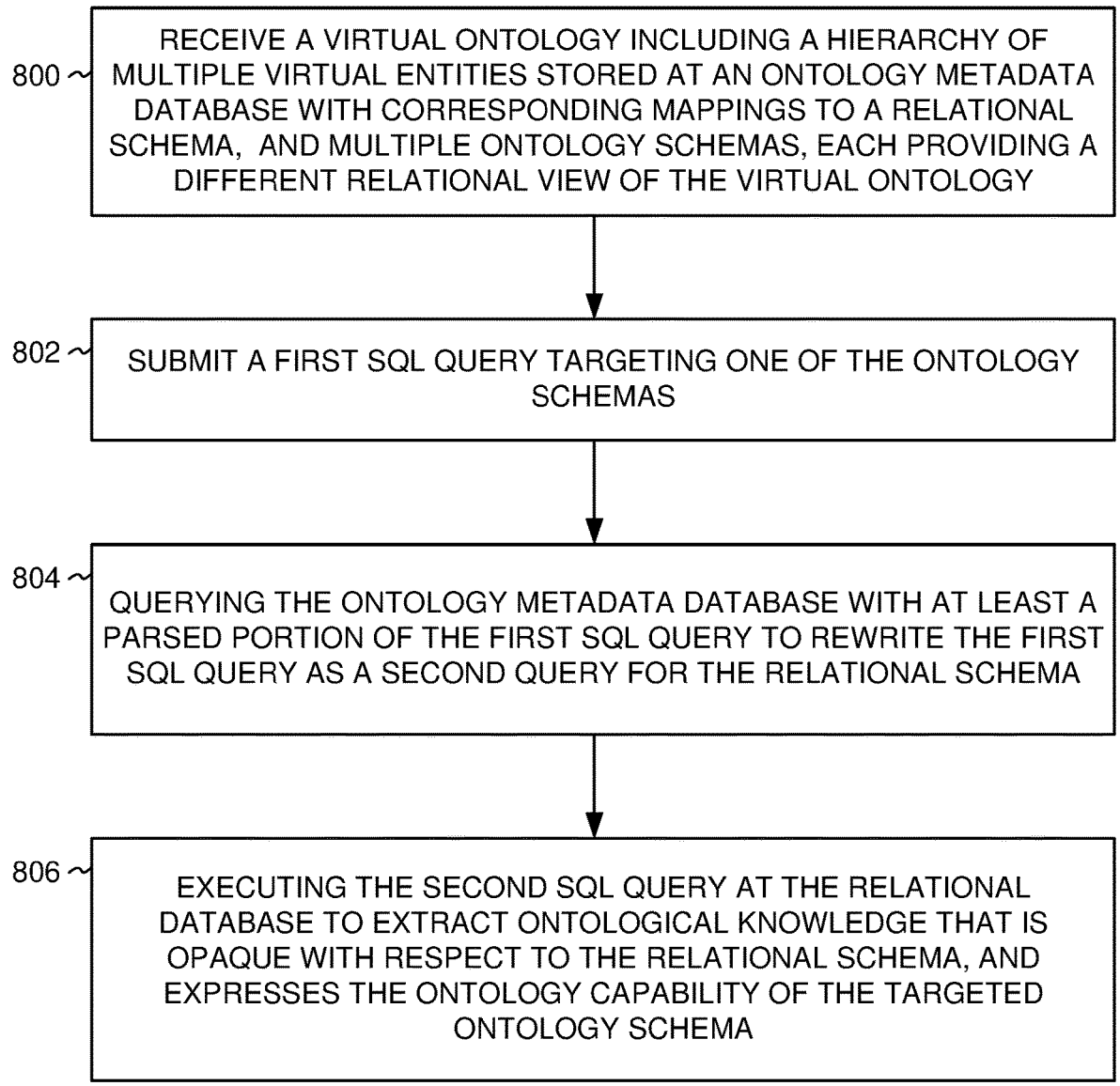
FIG. 8 is a schematic illustration of a method for extracting ontological knowledge from a relational database with a relational query, operative in accordance with a further embodiment of the disclosed technique.

Reference is now made to FIG. 8, which is a schematic illustration a method for extracting ontological knowledge from a relational database with a relational query, constructed and operative in accordance with a further embodiment of the disclosed technique.

In procedure 800 a virtual ontology is received. The virtual ontology includes a hierarchy of multiple virtual entities stored in association with multiple corresponding mappings in an ontology metadata database, and multiple ontology schemas. The corresponding mappings associate each of the multiple virtual entities with at least a subset of at least one of multiple physical tables of the relational database, thereby introducing data stored in the relational database to the virtual ontology. The multiple ontology schemas each provide a different relational view of the virtual ontology and capture at least one ontology capability. With reference to FIG. 1B, client 122 receives a virtual ontology 140, which includes ontology declarations 142 defining a hierarchy of virtual entities stored at ontology metadata database 146 in association with relational-to-ontology mappings 144, as well as multiple ontology schemas 148. Relational-to-ontology mappings 144 associate the virtual entities declared by ontology declarations 142 with at least a subset of at least one of the physical tables of RDBMS 128 defined by relational schema 140.

In procedure 802, a first relational query is submitted targeting one of the multiple ontology schemas. With reference to FIGS. 1B, 2A-2B, and 5A-5D, client 122 submits a first SQL query targeting dereferenced schema 500, i.e.

SELECT 'Enrolled_in.Subject' from Dereferenced.Student where name = 'Sam'

In procedure 804, the ontology metadata database is queried with at least a parsed portion of the first relational query to rewrite the first relational query as a second relational query with respect to a relational schema for the relational database. With reference to FIGS. 1B, 2A-2B, and 5A-5D, virtual-to-physical SQL converter 156 of SQL transpiler 150 queries ontology metadata database 146 with at least a parsed portion of the first SQL query to rewrite a second relational query. For example, the parsed portion is the virtual concept Student 266 (FIG. 2B), which is mapped to the physical table Student 256 (FIG. 2A). Virtual-to-physical converter 156 rewrites the second SQL query with respect to relational schema 250, by applying logic corresponding to dereferenced schema 500 (i.e. LEFT JOIN):

```
SELECT P.NAME as 'ENROLLED_IN_in[Class].Subject'
FROM Student S
LEFT JOIN Person P ON S.ID = P.ID
LEFT JOIN Enrollment ON P.ID = E. Student_ID
LEFT JOIN Class C ON C.Class_ID = E.Class_ID
WHERE P.NAME = 'SAM'
```

In procedure 806, the second relational query is executed at the relational database to extract ontological knowledge from the data, where the ontological knowledge is opaque with respect to the relational schema, and expresses the ontology capability captured by the targeted one of the multiple ontology schemas, thereby extracting said ontological knowledge within a relational framework. With reference to FIGS. 1B, 2A-2B, and 5A-5D, virtual-to-physical interface 158 submits the second SQL query to RDBMS engine 138 for execution. RDBMS engine 138 executes the second SQL query and provides the response to SQL transpiler 150 via virtual-to-physical interface 158. The response includes knowledge that captures the graph traversal capability of virtual ontology 240 that is opaque to relational schema 250, and captures the ontology capability of dereferenced schema 500 of ontology schemas 148.

In some embodiments, each of the multiple ontology schemas has a corresponding logic, and rewriting the first relational query as the second relational query comprises applying the corresponding logic.

It will be appreciated by persons skilled in the art that the disclosed technique is not limited to what has been particularly shown and described hereinabove. Rather the scope of the disclosed technique is defined only by the claims, which follow.

What is claimed is:

1. A method for implementing a virtual ontology over a relational database, comprising:
    defining a virtual ontology from multiple candidate ontologies for a relational database by
    a) declaring a hierarchy of multiple virtual entities;
    b) for each one of said multiple virtual entities in said hierarchy, declaring a corresponding mapping associating said one virtual entity with at least a subset of at least one physical table defined by a relational schema of said relational database, thereby introducing data stored in said relational database to said virtual ontology; and
    c) storing said virtual entity in association with said corresponding mapping in a virtual ontology metadata database implemented as a relational database; and
    defining multiple ontology schemas, each implemented as a different relational view of said virtual ontology and capturing at least one ontology capability,
    wherein querying said ontology metadata database with at least a parsed portion of an intercepted first relational query targeting one of said multiple ontology schemas enables rewriting said first relational query as a second relational query, wherein executing said second relational query at said relational database enables extracting ontological knowledge from said data that is opaque with respect to said relational schema and which expresses said at least one ontology capability captured by said targeted one of said multiple ontology schemas,
    thereby enabling extracting said ontological knowledge within a relational framework.

2. The method of claim 1, wherein said multiple virtual entities comprise concepts and properties, wherein each said defined concept includes at least one of said properties.

3. The method of claim 1, wherein said at least one ontology capability captured by said multiple ontology schemas comprises said defined hierarchy.

4. The method of claim 1, wherein said at least one ontology capability captured by said multiple ontology schemas is an inheritance capability between two of said multiple virtual entities.

5. The method of claim 1, wherein said at least one ontology capability captured by said multiple ontology schemas is a graph traversal capability between two of said multiple virtual entities.

6. The method of claim 5, and wherein said graph traversal capability further captures transitivity from said two of said multiple virtual entities to a third one of said multiple virtual entities.

7. The method of claim 5, and wherein said at least one ontology capability further includes a reverse flow of said graph traversal capability.

8. The method of claim 1, wherein said at least one ontology capability further comprises a logic calculation with respect to at least one of said multiple virtual entities.

9. The method of claim 1, wherein each of said multiple ontology schemas has a corresponding logic, wherein rewriting said first relational query as said second relational query comprises applying said logic corresponding to said targeted one of said multiple ontology schemas.

10. A system for implementing a virtual ontology over a relational database, comprising:
    a relational database management system (RDBMS), comprising:
        a relational database comprising data organized in multiple physical tables with a corresponding relational schema defining a structure for said relational database, and
        an RDBMS execution engine; and
    an ODM computer comprising:
        an ODM storage unit configured to store a virtual ontology, said virtual ontology comprising:
            a hierarchy of multiple virtual entities,
            multiple corresponding mappings associating each of said multiple virtual entities with at least a subset of at least one of said multiple physical tables, thereby introducing data stored in said relational database to said virtual ontology,
            an ontology metadata database storing said hierarchy of multiple virtual entities with said multiple corresponding mappings, and
            multiple ontology schemas, each one of said multiple ontology schemas providing a different relational view of said virtual ontology and capturing at least one ontology capability, and
        an ODM processor configured to:
            intercept a first relational query targeting one of said ontology schemas, and
            query said ontology metadata database with at least a parsed portion of said first relational query to rewrite said first relational query as a second relational query, wherein executing said second relational query at said relational database enables extracting ontological knowledge from said data that is opaque with respect to said relational schema and which expresses said ontology capability captured by said targeted one of said multiple ontology schemas, thereby enabling extracting said ontological knowledge within a relational framework.

11. The system of claim 10, wherein said multiple virtual entities comprise concepts and properties, wherein each said defined concept includes at least one of said properties.

12. The system of claim 10, wherein said at least one ontology capability captured by said multiple ontology schemas comprises said defined hierarchy.

13. The system of claim 10, wherein said at least one ontology capability captured by said multiple ontology schemas is an inheritance capability between two of said multiple virtual entities.

14. The system of claim 10, wherein said at least one ontology capability captured by said multiple ontology schemas is a graph traversal capability between two of said multiple virtual ontology entities.

15. The system of claim 14, and wherein said graph traversal capability further captures transitivity from said two of said multiple virtual entities to a third one of said multiple virtual entities.

16. The system of claim 14, and wherein said at least one ontology capability further includes a reverse flow of said graph traversal capability.

17. The system of claim 10, wherein said at least one ontology capability further comprises a logic calculation with respect to at least one of said multiple virtual entities.

18. The system of claim 10, wherein each one of said multiple ontology schemas has a corresponding logic, wherein rewriting said first relational query as said second relational query comprises applying said logic corresponding to said targeted one of said multiple ontology schemas.

19. A method for extracting ontological knowledge from a relational database with a relational query, comprising:
receiving a virtual ontology, comprising:
a hierarchy of multiple virtual entities,
multiple corresponding mappings associating each of said multiple virtual entities with at least a subset of at least one of multiple physical tables of said relational database, thereby introducing data stored in said relational database to said virtual ontology,
an ontology metadata database storing said hierarchy of multiple virtual entities with said multiple corresponding mappings, and
multiple ontology schemas, each providing a different relational view of said virtual ontology and capturing at least one ontology capability;
submitting a first relational query targeting one of said multiple ontology schemas;
querying said ontology metadata database with at least a parsed portion of said first relational query to rewrite said first relational query as a second relational query with respect to a relational schema for said relational database; and
executing said second relational query at said relational database to extract ontological knowledge from said data that is opaque with respect to said relational schema, said ontological knowledge expressing said at least one ontology capability captured by said targeted one of said multiple ontology schemas,
thereby extracting said ontological knowledge within a relational framework.

20. The method of claim 19, wherein said multiple virtual entities comprise concepts and properties, wherein each said defined concept includes at least one of said properties.

21. The method of claim 19, wherein said at least one ontology capability captured by said multiple ontology schemas comprises said defined hierarchy.

22. The method of claim 19, wherein said at least one ontology capability captured by said multiple ontology schemas is an inheritance capability between two of said multiple virtual entities.

23. The method of claim 19, wherein said at least one ontology capability captured by said multiple ontology schemas is a graph traversal capability between two of said multiple virtual entities.

24. The method of claim 23, and wherein said graph traversal capability further captures transitivity from said two of said multiple virtual entities to a third one of said multiple virtual entities.

25. The method of claim 23, and wherein said at least one ontology capability further includes a reverse flow of said graph traversal capability.

26. The method of claim 19, wherein said at least one ontology capability further comprises a logic calculation with respect to at least one of said multiple virtual entities.

27. The method of claim 19, wherein each one of said multiple ontology schemas has a corresponding logic, wherein rewriting said first relational query as said second relational query comprises applying said logic corresponding to said targeted one of said multiple ontology schemas.

* * * * *